US006891995B2

(12) United States Patent
Ikushima et al.

(10) Patent No.: US 6,891,995 B2
(45) Date of Patent: May 10, 2005

(54) WAVELENGTH DIVISION MULTIPLEX TRANSMISSION SYSTEM

(75) Inventors: Tsuyoshi Ikushima, Kadoma (JP); Masaru Fuse, Neyagawa (JP); Toshihiko Yasue, Moriguchi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 146 days.

(21) Appl. No.: 10/373,699

(22) Filed: Feb. 27, 2003

(65) Prior Publication Data

US 2003/0165286 A1 Sep. 4, 2003

(30) Foreign Application Priority Data

Mar. 1, 2002 (JP) ........................................ 2002-056086
Mar. 13, 2002 (JP) ........................................ 2002-068761

(51) Int. Cl.[7] .............................. G02B 6/28; H04J 14/00
(52) U.S. Cl. ................................ 385/24; 398/6; 398/43; 398/48
(58) Field of Search ................................ 385/24; 398/6, 398/43, 48

(56) References Cited

U.S. PATENT DOCUMENTS

| | | | | |
|---|---|---|---|---|
| 5,189,542 A | * | 2/1993 | Oudar ......................... | 398/48 |
| 5,818,846 A | * | 10/1998 | Mori et al. ................. | 370/532 |
| 5,959,749 A | * | 9/1999 | Danagher et al. ............. | 398/83 |
| 6,246,348 B1 | * | 6/2001 | Moscatelli ................... | 341/68 |
| 6,310,703 B1 | | 10/2001 | Alavie et al. | |
| 6,657,773 B2 | * | 12/2003 | Chiaroni et al. ............ | 359/326 |

FOREIGN PATENT DOCUMENTS

JP 11-31859 2/1999

OTHER PUBLICATIONS

"Study on Specification of Optical Device for WDM/SCM Optical Transmission System Using Direct Modulation", Tsuyoshi Ikushima et al., Technical Report of IEICE (The Institute of Electronics, Information and Communication Engineers), OCS99–63 (Sep. 1999)), pp. 59–64, English Abstract.

* cited by examiner

*Primary Examiner*—John D. Lee
*Assistant Examiner*—Tina M Lin
(74) *Attorney, Agent, or Firm*—Wenderoth, Lind & Ponack, L.L.P.

(57) ABSTRACT

A first transmitting section frequency-multiplexes a data signal and a monitor signal, and then converts the resultant signal to an optical signal for output. A first receiving section converts the optical signal transmitted via a first optical transmission path and a wavelength demultiplexer into an electrical signal, and then extracts the monitor signal. A difference detector compares a monitor signal level with a predetermined reference level, and then outputs wavelength information to a second optical transmission path. Based on the wavelength information transmitted via the second optical transmission path, a first wavelength controller adjusts the wavelength of the optical signal for stabilization at a predetermined wavelength. Thus, it is possible to achieve a wavelength division multiplex transmission system capable of controlling the wavelength of the optical signal at low cost.

12 Claims, 19 Drawing Sheets

FIG. 8A  OUTPUT WAVEFORM OF MONITOR SIGNAL SOURCE
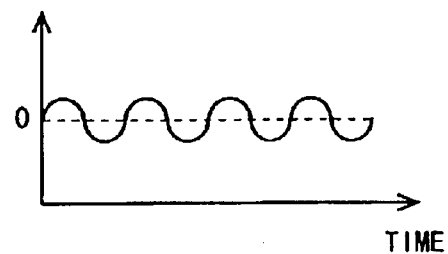
FIG. 8B  OUTPUT LIGHT INTENSITY OF SEMICONDUCTOR LASER
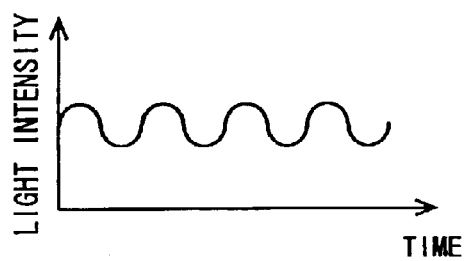
FIG. 8C  OUTPUT WAVEFORM OF POLARITY INVERTER
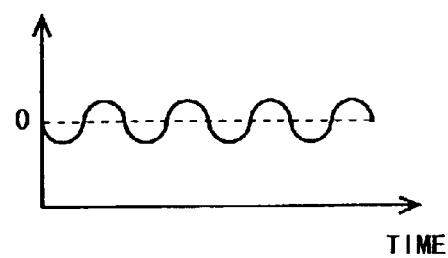
FIG. 8D  DATA
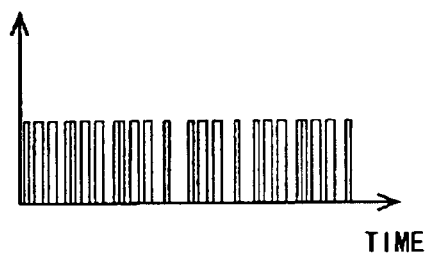
FIG. 8E  INPUT WAVEFORM OF INTENSITY MODULATOR
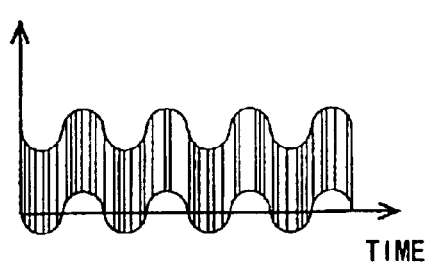
FIG. 8F  OUTPUT LIGHT INTENSITY OF INTENSITY MODULATOR
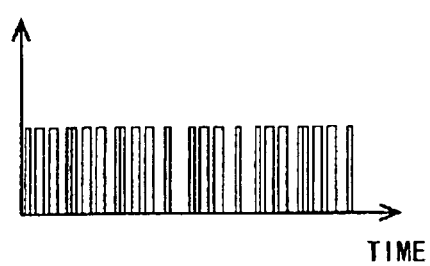

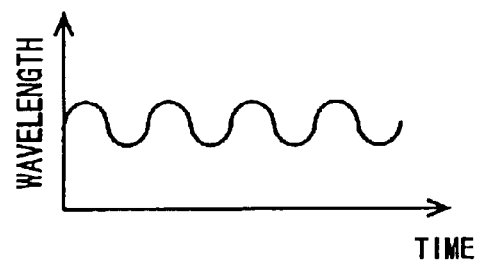
F I G. 9A  OUTPUT OF SEMICONDUCTOR LASER
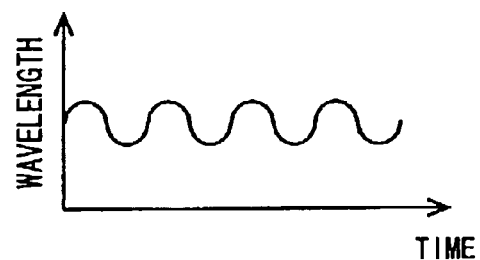
F I G. 9B  OUTPUT OF INTENSITY MODULATOR
F I G. 10
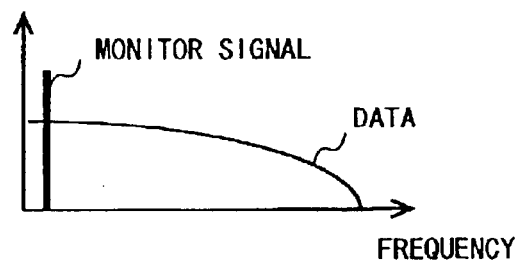

| OPTICAL SIGNAL CENTER FREQUENCY $\lambda_0$ | $<\lambda c$ | $=\lambda c$ | $>\lambda c$ |
|---|---|---|---|
| $dT/d\lambda$ | + | 0 | − |
| AMPLITUDE OF TRANSMISSION RATE DIFFERENTIAL SIGNAL | >0 | 0 | >0 |
| PHASE OF TRANSMISSION RATE DIFFERENTIAL SIGNAL | IN-PHASE | | OPPOSITE PHASE |

| OPTICAL SIGNAL CENTER WAVELENGTH $\lambda_0$ | $< \lambda_c$ | $= \lambda_c$ | $> \lambda_c$ |
|---|---|---|---|
| $dT/d\lambda$ | + | 0 | − |
| CONTROL SIGNAL | + | 0 | − |

FIG. 19A  OUTPUT WAVEFORM OF MONITOR SIGNAL SOURCE
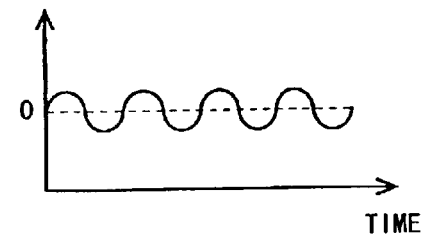
FIG. 19B  OUTPUT LIGHT INTENSITY OF SEMICONDUCTOR LASER
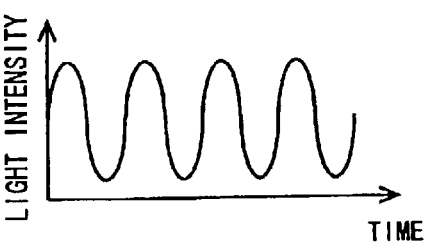
FIG. 19C  OUTPUT WAVEFORM OF POLARITY INVERTER
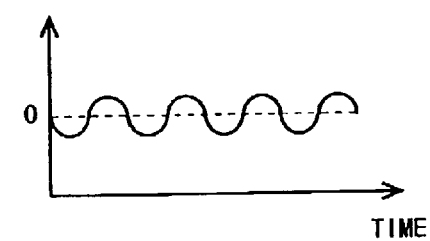
FIG. 19D  DATA
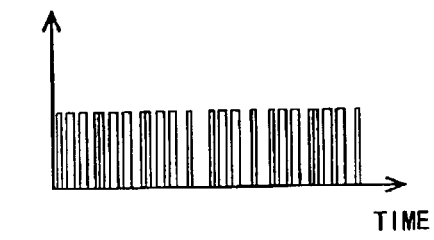
FIG. 19E  INPUT WAVEFORM OF INTENSITY MODULATOR
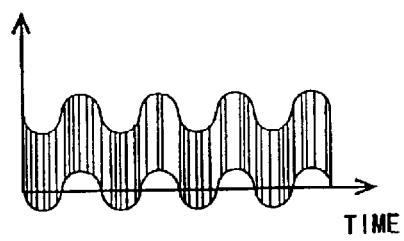
FIG. 19F  OUTPUT LIGHT INTENSITY OF INTENSITY MODULATOR
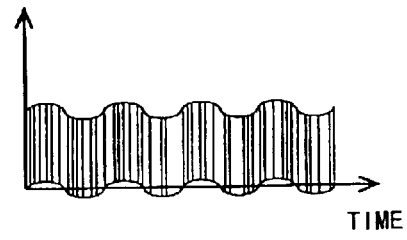

| OPTICAL SIGNAL CENTER WAVELENGTH $\lambda_o$ | $<\lambda_c$ | $=\lambda_c$ | $>\lambda_c$ |
|---|---|---|---|
| AMPLITUDE | $>X$ | $=X$ | $<X$ |

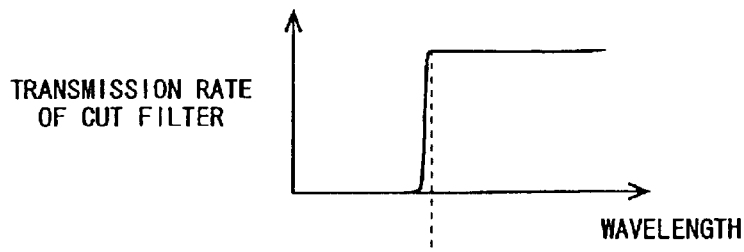
FIG. 24A PRIOR ART — TRANSMISSION RATE OF CUT FILTER
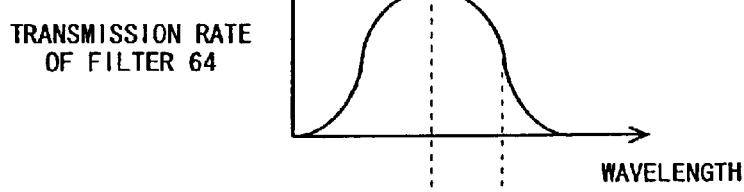
FIG. 24B PRIOR ART — TRANSMISSION RATE OF FILTER 64
FIG. 24C PRIOR ART — REFLECTION RATE OF FILTER 64
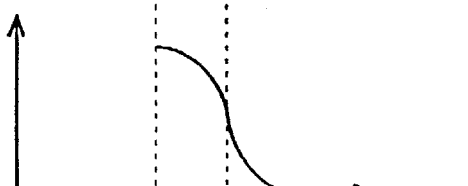
FIG. 24D PRIOR ART — LIGHT-RECEIVING LEVEL A OF PHOTODIODE 65
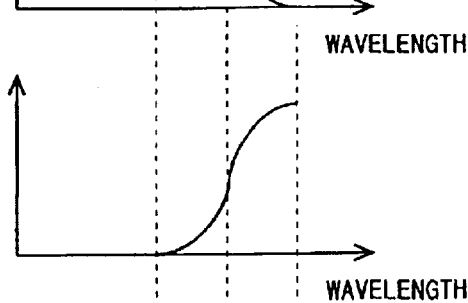
FIG. 24E PRIOR ART — LIGHT-RECEIVING LEVEL B OF PHOTODIODE 66
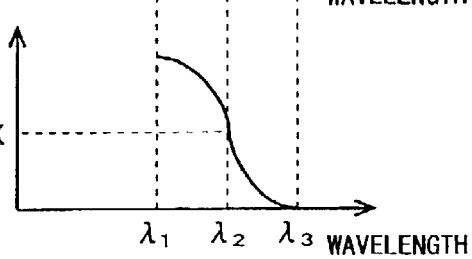
FIG. 24F PRIOR ART — WAVELENGTH MONITOR SIGNAL

WAVELENGTH DIVISION MULTIPLEX TRANSMISSION SYSTEM

BACKGROUND OF THE INVENTION

1. Field of the Invention

The present invention relates to wavelength division multiplex transmission systems for transmitting optical signals having different wavelengths by using a wavelength division multiplex technology.

2. Description of the Background Art

In recent years, in order to cope with an increase in demand for large-volume data, a high-density wavelength division multiplex transmission system (hereinafter referred to as a DWDM system) has been rapidly widespread.

In the DWDM system, a plurality of optical signals are transmitted with their wavelengths aligned at narrow intervals of 1 nm or less. Therefore, transmission characteristics of a wavelength demultiplexer for demultiplexing and extracting the optical signals have to be steeply attenuated outside a desired wavelength band. For this reason, even if the wavelength of the optical signal is slightly deviated from the transmission center waveform of the waveform demultiplexer, excessive losses disadvantageously occur. In order to cope with this disadvantage, the wavelength of light output from a semiconductor laser should be accurately controlled. Conventionally, a wavelength control technique has been employed in the wavelength division multiplex transmission system in order to control the wavelength of an optical signal to be transmitted so that the wavelength is at an appropriate wavelength. Hereinafter, a conventional wavelength control technique is specifically described.

FIG. 22 illustrates the configuration of a conventional wavelength division multiplex transmission system. In FIG. 22, a conventional wavelength control means includes first through N-th (N is an integer of 2 or more) transmitting sections 2211 through 221N, first through N-th controllers 2221 through 222N, a wavelength multiplexer 223, an optical transmission path 224, a wavelength demultiplexer 225, and first through N-th receiving sections 2261 through 226N. Here, the first transmitting section 2211 includes a data signal source 2201, an electrical-optical converter 2202, and an optical brancher 2203. The first controller 2221 includes an optical filter 2204, an optical-electrical converter 2205, a wavelength detector 2206, and a wavelength controller 2207. Although not shown, a k-th (k is an integer from 2 to N) transmitting section 221k and a k-th controller 222k have the same structure as the first transmitting section 2211 and the first controller 2221, respectively.

The operation of the conventional wavelength control means illustrated in FIG. 22 is described below. The first through N-th transmitting sections 2211 through 221N convert a data signal to be transmitted to optical signals having different wavelengths. The first through N-th controllers 2221 through 222N are provided correspondingly to the first through N-th transmitting sections 2211 through 221N, so as to control the wavelength of the optical signal outputted from the corresponding transmitting section. The wavelength multiplexer 223 wavelength-multiplexes first through N-th optical signals supplied by the first through N-th transmitting sections 2211 through 221N. The optical transmission path 224 leads an optical signal output from the wavelength multiplexer 223. The wavelength demultiplexer 225 is provided with N output terminals, and has wavelength bands that give different maximum transmission rates for the respective output terminals. The wavelength demultiplexer 225 demultiplexes the optical signal transmitted via the optical transmission path 224 into the first through N-th optical signals for output from the output terminals. The first through N-th receiving sections 2261 through 226N are connected to the output terminals of the wavelength demultiplexer 225, and each convert the optical signal to an electrical signal (data signal).

The operation of each transmitting section and controller is described next below. In the following, descriptions are made to the operation of the first transmitting section 2211 and the first controller 2221, and these descriptions are also applicable to the operation of the other transmitting sections and controllers. In the first transmitting section 2211, the data signal source 2201 generates a data signal to be transmitted. The electrical-optical converter 2202 converts the electrical signal output from the data signal source 2201 to an optical signal. The optical brancher 2203 branches the optical signal output from the electrical-optical converter 2202 into two, one being supplied to the wavelength multiplexer 223 and the other being supplied to the first controller 2221.

In the first controller 2221, the optical filter 2204 possesses predetermined transmission characteristics for passing the optical signal supplied by the optical brancher 2203 for output to the optical-electrical converter 2205. The optical-electrical converter 2205 converts the optical signal output from the optical filter 2204 to an electrical signal for output to the wavelength detector 2206. Here, the predetermined transmission characteristics of the optical filter 2204 are such that a transmission rate is varied depending uniquely on the wavelength of the input optical signal. That is, the level of the signal output from the optical-electrical converter 2205 is varied depending on the wavelength of the optical signal supplied to the optical filter. Based on such characteristics, the wavelength detector 2206 outputs wavelength information. The wavelength controller 2207 controls the electrical-optical converter 2202 based on the wavelength information output from the wavelength detector 2206 so that the level of the electrical signal output from the optical-electrical converter 2205 has a predetermined value. With this control, the optical signal output from the first transmitting section 2211 is adjusted to have a predetermined wavelength.

As another example of conventional wavelength multiplex techniques, a wavelength control apparatus disclosed in Japanese Patent Laid-Open Publication No. H11-31859 (1999-31859) is described below. FIG. 23 illustrates the configuration of this wavelength control apparatus. The wavelength control apparatus includes a semiconductor laser 231, a cut filter 232, a beam splitter 233, an optical band-pass filter 234, photodiodes 235 and 236, an output power ratio calculator 237, and a wavelength controller 238. Light output from the semiconductor laser 231 first passes through the cut filter 232 having transmission characteristics as shown in FIG. 24A, and then enters the beam splitter 233. The beam splitter 233 passes part of the injected light and reflects the rest. The light passing through the beam splitter 233 is used for signal transmission, and the reflected light is used for wavelength monitoring, which is described below. The light reflected by the beam splitter 233 first enters the optical band-pass filter 234 having transmission characteristics shown in FIG. 24B. Light passing through the optical band-pass filter 234 enters the photodiode 235, and reflected light enters the photodiode 236. The wavelength dependency of the photodiode 235 at a light-receiving level can be given by the product of a transmission rate of the cut filter 232 and a transmission rate of the optical band-pass filter 234, which is as illustrated in FIG. 24D. On the other hand, the wavelength dependency of the photodiode 236 at a light-receiving level can be given by the product of the transmission rate of the cut filter 232 and a reflection rate of the optical band-pass filter 234, which is as illustrated in FIG. 24E. Outputs from the photodiodes are supplied to the output power ratio calculator 237. Here, an output level from the photodiode 235 is taken as A, and an output level from the photodiode 236 is taken as B. The output power ratio calculator 237 calculates an output power ratio of (A−B)/(A+B) for output as a wavelength monitor signal (refer to FIG. 24F). The wavelength controller 38 controls a wavelength of the light emitted from the semiconductor laser 231 so that the wavelength monitor signal has a predetermined value X. With the predetermined value X being set to a value corresponding to a transmission center wavelength of the wavelength demultiplexer, the wavelength λ2 of the light emitted from the semiconductor laser can be appropriately controlled.

As described above, in the conventional wavelength control technique, each transmitting section has to be provided with an optical filter for controlling the wavelength of an output optical signal, an optical brancher, and an optical-electrical converter (photodiode, for example), or a wavelength locker composed of the above-mentioned components, in order to accurately control and stabilize the wavelength of each optical signal. However, these optical devices are generally expensive. Therefore, extremely high costs are disadvantageously required for each transmitting section. Furthermore, with these expensive optical devices being required for each transmitting section, cost effectiveness of the entire wavelength division multiplex transmission system is significantly degraded as the size of the system is increased.

Still further, the wavelength demultiplexer (the wavelength demultiplexer 225 of FIG. 22) placed on the optical transmission path has a characteristic that its transmission characteristics are changed depending on the ambient temperature or the like. In the conventional wavelength division multiplex transmission system, however, such a characteristic of the wavelength demultiplexer is not considered by the wavelength controller. Therefore, the conventional system does not have any means for improving and stabilizing signal transmission characteristics having degraded by changes in the transmission characteristics of the wavelength demultiplexer. Particularly, when a wavelength locker is used, the wavelength locker is manufactured so as to be specifically targeted for a predetermined wavelength, which cannot be easily reset. For this reason, it is difficult to mitigate degradation of the signal transmission characteristics in the wavelength division multiplex transmission system.

SUMMARY OF THE INVENTION

Therefore, an object of the present invention is to provide a wavelength division multiplex transmission system capable of monitoring and controlling an optical wavelength without newly adding an expensive optical device. Another object of the present invention is to provide a wavelength division multiplex transmission system capable of more flexibly stabilizing the wavelength.

The present invention includes the following features to attain at least one of the objects mentioned above. Note that reference numerals and characters and figure numbers in parentheses merely show a correspondence between the features and embodiments which are described further below in order to provide assistance in understanding the present invention, and are not meant to restrict the scope of the present invention.

A system of the present invention is a wavelength division multiplex transmission system in which optical signals of different wavelengths are transmitted by using a wavelength division multiplex scheme, and includes a transmitting section (111, 1101, 2101, 3101), a wavelength multiplexer (13, 53), an optical transmission path (21), a wavelength demultiplexer (32, 65), a control signal generator (303, 105, 62, 79), and a wavelength controller (121). The transmitting section uses an electrical-optical converter (104, 41) for generating an optical signal having therein a monitor signal multiplexed on a data signal to be transmitted and having wavelength chirp due to the monitor signal. The wavelength multiplexer multiplexes the optical signal generated by the transmitting section with another optical signal having a wavelength different from a wavelength of the optical signal. The optical transmission path propagates a multiplexed optical signal obtained by the wavelength multiplexer. The wavelength demultiplexer demultiplexes the optical signal propagated via the optical transmission path, and obtains the optical signal generated by the transmitting section so as to obtain the data signal. The control signal generator generates a control signal based on the monitor signal included in the optical signal after a desired wavelength (λt) is extracted based on a transmission characteristic (dotted lines in FIGS. 2A and 2B) of the wavelength multiplexer or the wavelength demultiplexer. The wavelength controller controls, based on the control signal, a wavelength of light output from the electrical-optical converter. As such, in the wavelength division multiplex transmission system, a wavelength control is performed by using the transmission characteristics of the optical device (the wavelength multiplexer or the wavelength demultiplexer), which are originally required for transmitting a data signal in the system, without requiring an expensive optical device, such as an optical filter, dedicated to the wavelength control. Therefore, it is possible to greatly reduce cost associated with the wavelength control.

Also, the wavelength demultiplexer (32) may demultiplex the optical signal propagated via the optical transmission path into signals according to the wavelengths, and outputs the signals, and the control signal generator (303) may generate the control signal based on the monitor signal included in the optical signal output from the wavelength demultiplexer (FIG. 1).

Furthermore, the wavelength demultiplexer is a wavelength selector (65) for extracting only an optical signal having the desired wavelength from optical signals propagated via the optical transmission path, and the control signal generator (62) generates the control signal based on the monitor signal included in the optical signal output from the wavelength selector (FIG. 13).

Still further, the wave length multiplexer (53) may have a plurality of input terminals each for passing only an optical signal having a predetermined different wavelength and a single output terminal, may wavelength-multiplex optical signals of different wavelengths received at the input terminals, and may output an optical signal from the output terminal. The control signal generator (62) may generate the control signal based on the monitor signal included in the optical signal output from the wavelength multiplexer (53) (FIG. 14).

Still further, the transmitting section (111) may include a frequency multiplexer (103) for frequency-multiplexing the data signal and the monitor signal, and the light output from the electrical-optical converter (104) may be directly modulated based on an output from the frequency multiplexer (FIG. 1).

Still further, the control signal generator (311) may include: an optical-electrical converter (301) for converting the optical signal after the desired wavelength is extracted based on the transmission characteristic of the wavelength multiplexer or the wavelength demultiplexer to an electrical signal; and a filter (302) for extracting the monitor signal from the electrical signal obtained through conversion by the optical-electrical converter. Also, the control signal generator may generate the control signal based on a level of the monitor signal extracted by the filter (FIG. 1).

Still further, the control signal generator (311) may further include a difference detector (303) for finding a difference between the level of the monitor signal extracted by the filter (302) and a predetermined reference level (Pt), and the control signal generator may generate the control signal based on the detection results of the difference detector (FIG. 1).

Still further, the difference detector (303) can reset the reference level (Pt). With this, it is possible to flexibly adapt to changes in the environment where the system is located.

Still further, the light output from the electrical-optical converter (41) may be directly modulated by the monitor signal (102), and the transmitting section (1101) may include an intensity modulator (47) for intensity-modulating the light output from the electrical-optical converter with the data signal (FIG. 6).

Still further, the transmitting section (1101) may include a polarity inverter (45) for inverting a polarity of the monitor signal for output, and the intensity modulator (47) may intensity-modulate the light output from the electrical-optical converter (41) with a signal having therein a signal output from the polarity inverter multiplexed with the data signal (FIG. 6). With this, it is possible to reduce an intensity-modulated component caused by the monitor signal.

Still further, a modulation index of the electrical-optical converter (41) and a modulation index of the intensity modulator (47) may be set so that, in the light output from the intensity modulator, an intensity-modulated component (FIG. 8B) caused by the monitor signal and an intensity-modulated component (FIG. 8F) caused by the signal output from the polarity inverter are cancelled by each other (FIG. 8F) With this, when the wavelength of the optical signal coincides with the center wavelength of the wavelength demultiplexer, the level of the monitor signal detected at the receiving side is 0. Therefore, whether the wavelengths have coincided with each other can be clearly detected.

Still further, a plurality of transmitting sections (111), control signal generators (311), and wavelength controllers (121) may be provided. In this case, the wavelength multiplexer may have a plurality of input terminals each for passing only an optical signal having a predetermined different wavelength and a single output terminal, may wavelength-multiplex optical signals of different wavelengths output from the plurality of said transmitting sections (111 through 11N) and received at the input terminals, and may output an optical signal from the output terminal. Here, the monitor signals each to be multiplexed on the data signal in each of the transmitting sections (111 through 11N) may have different frequencies. Each of the control signal generators (311 through 31N) may extract the intensity-modulated component caused by the monitor signal multiplexed on the data signal at each corresponding transmitting section (111 through 11N), and may generate the control signal based on the extracted intensity modulated component (FIG. 1). With this, all components required for wavelength control can be gathered in the transmitting side, thereby allowing easy maintenance.

Still further the control signal generator (62) may include an amplitude detector (63) for detecting an amplitude of the intensity-modulated component caused by the monitor signal in the optical signal after the desired wavelength is extracted based on the transmission characteristic of the wavelength multiplexer or the wavelength demultiplexer, and a phase detector (64) for detecting a phase of the intensity-modulated component, and may output the detected amplitude and phase as the control signal. Also, the wavelength controller (121) may determine whether to increase or decrease the wavelength of the light output from the electrical-optical converter (41) based on the phase, and may control the wavelength of the light so that the amplitude is 0 (FIG. 11). With this, whether to increase or decrease the wavelength for control can be detected without adding an expensive optical device.

Furthermore, the wavelength division multiplex transmission system may further include a pilot signal source (48) for dividing a frequency of the monitor signal and outputting a pilot signal. Here, the intensity modulator (47) may intensity-modulate the light output from the electrical-optical converter (41) with a signal having therein the signal output from the polarity inverter (45) and the pilot signal output from the pilot signal source (48) multiplexed with the data signal. The control signal generator (3301) may include: an optical-electrical converter (301) for converting the optical signal after the desired wavelength is extracted based on the transmission characteristic of the wavelength multiplexer (13) or the wavelength demultiplexer (32) to an electrical signal; a first band-pass filter (71) for extracting an intensity-modulated component caused by the monitor signal from the electrical signal output from the optical-electrical converter; a second band-pass filter (72) for extracting the pilot signal from the electrical signal; a frequency multiplier (73) for multiplying a frequency of the pilot signal extracted by the second band-pass filter; a multiplier (74) for multiplying the intensity-modulated component extracted by the first band-pass filter by the pilot signal output from the frequency multiplier; and a low-pass filter (75) for extracting a direct current level of an output signal of the multiplier and outputting the direct current level as the control signal. The wavelength controller (121) may control the wavelength of the electrical-optical converter (41) so that the direct current level output from the low-pass filter (75) is 0 (FIGS. 16 and 17). With this, only one type of signal is required to be fed back as the control signal.

Still further, a modulation index of the electrical-optical converter (41) and a modulation index of the intensity modulator may be set so that, in the light output from the intensity modulator (47), an intensity-modulated component (FIG. 19B) caused by the monitor signal and an intensity-modulated component (FIG. 19E) caused by the signal output from the polarity inverter (45) are partially cancelled by each other (FIG. 19F). Also, an output waveform of the electrical-optical converter is controlled so that an amplitude of an intensity-modulated component caused by the monitor signal in the optical signal after the desired wavelength ($\lambda_c$) is extracted based on the transmission characteristic of the wavelength multiplexer (13) or the wavelength demultiplexer (32) has a predetermined value (X) (FIG. 21). With this, only one type of signal is required to be fed back as the control signal, and only the amplitude is required to be detected. Therefore, the configuration of the system can be simplified.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8A through 8F are illustrations showing a waveform of each component in the third embodiment of the present invention;

FIGS. 9A and 9B are illustrations each showing changes with time of an optical signal wavelength according to the third embodiment of the present invention;

FIG. 10 is an illustration showing frequencies at which signals are located in the third embodiment of the present invention;

FIGS. 19A through 19F are illustrations each showing a wavelength of each component according to a sixth embodiment of the present invention;

FIGS. 24A through 24F are illustrations showing characteristics of each component of the conventional wavelength control apparatus.

DESCRIPTION OF THE PREFERRED EMBODIMENTS

Hereinafter, various embodiments of the present invention are described below with reference to the drawings.

(First Embodiment)

Figure 1:
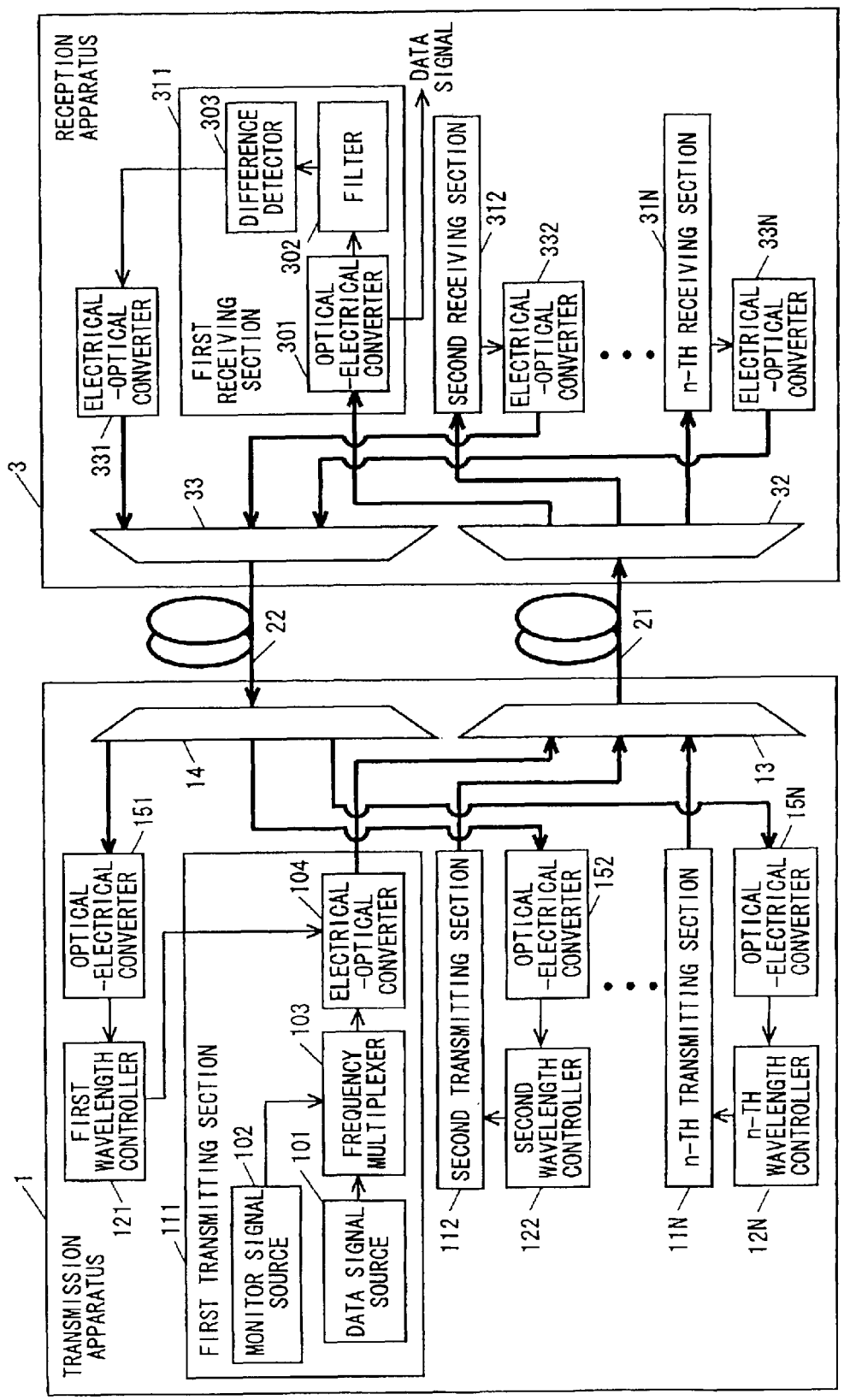
FIG. 1 is a block diagram illustrating the configuration of a wavelength division multiplex transmission system according to a first embodiment of the present invention.

A wavelength division multiplex transmission system according to a first embodiment of the present invention is described below. FIG. 1 is a block diagram illustrating the configuration of a wavelength division multiplex transmission system according to the present invention. In FIG. 1, the wavelength division multiplex transmission system includes a transmission apparatus 1, first and second optical transmission paths 21 and 22 typified by optical fibers, and a reception apparatus 3. The transmission apparatus 1 includes first through N-th transmitting sections 111 through 11N, first through N-th wavelength control sections 121 through 12N, a wavelength multiplexer 13, a wavelength demultiplexer 14, and N optical-electrical converters 151 through 15N. The reception apparatus 3 includes first through N-th receiving sections 311 through 31N, a wavelength demultiplexer 32, N electrical-optical converters 331 through 33N, and a wavelength multiplexer 33.

Furthermore, the first transmitting section 111 includes a data signal source 101, a monitor signal source 102, a frequency multiplexer 103, and an electrical-optical converter 104. Furthermore, the first receiving section 311 includes an optical-electrical converter 301, a filter 302, and a difference detector 303. Note that the structures of the first transmitting and receiving sections 111 and 311 can be applied to those of a k-th (k is an integer from 2 to N) transmitting section 11k and a k-th receiving section 31k, respectively.

The operation of the wavelength division multiplex transmission system is described below. First, the operation of the first transmitting section 111 is described. The first transmitting section 111 frequency-multiplexes a data signal to be transmitted and a monitor signal having a predetermined frequency to obtain an optical modulated signal for output. Specifically, the data signal source 101 outputs a data signal to be transmitted. The monitor signal source 102 outputs a sine wave signal having a predetermined frequency as a monitor signal. Note that the frequency of the monitor signal will be described further below in FIGS. 4A and 4B. The frequency multiplexer 103 frequency-multiplexes the data signal output from the data signal source 101 and the monitor signal output from the monitor signal source 102. The electrical-optical converter 104 converts an electrical signal output from the frequency multiplexer 103 to an optical modulated signal for output. Here, it is assumed that a semiconductor laser is used as a light source, for example, and that the electrical-optical converter 104 employs a direct modulating scheme for modulating an injection current with a frequency multiplex signal to output an optical modulated signal having wavelength chirp (wavelength fluctuations along with optical modulation). Thus, the transmitting section 111 can convert the electrical signal obtained by multiplexing the data signal and the monitor signal to an optical signal.

The operation of the k transmitting section 11k is similar to that of the first transmitting section 111. Here, the first through N transmitting sections 111 through 11N output optical signals of different wavelengths. The wavelength multiplexer 13 wavelength-multiplexes first through N-th downstream optical signals output from the first through N-th transmitting sections 111 through 11N. The wavelength-multiplexed optical signal obtained by the wavelength multiplexer 13 goes through the first optical transmission path 21. The wavelength demultiplexer 32 has N output terminals of different wavelength pass bands each of which provides a maximum transmission rate. Therefore, the wavelength demultiplexer 32 wavelength-demultiplexes the input optical signal, and then outputs the first through N-th downstream optical signals from the respective output terminals. The first through N receiving sections 311 through 31N are connected to the N output terminals of the wavelength demultiplexer 32 for receiving the first through N-th downstream optical signals.

The operation of each of the first through N-th receiving sections 311 through 31N is described below by taking the first receiving section 311 as an example. The optical-electrical converter 301 converts the first downstream optical signal supplied by the wavelength demultiplexer 32 to an electrical signal. The filter 302 extracts the monitor signal from the electrical signal output from the optical-electrical converter 301. That is, the filter 302 has a characteristic so as to pass the monitor signal but not to pass the data signal. The data signal multiplexed with the monitor signal is transmitted from the optical-electrical converter 301 via a data signal extracting filter not shown to a data signal processing apparatus inside or outside of the receiving apparatus. The difference detector 303 compares a signal level of the monitor signal supplied by the filter 302 with a predetermined reference level to detect a difference in wavelength between a desired wavelength and the wavelength of the actually-received optical signal. Here, the desired wavelength is a predetermined wavelength set as a controlled target. The desired wavelength is preferably a wavelength having a maximum value in the wavelength demultiplexer 32. For example, the desired wavelength in the difference detector 303 of the first receiving section is preferably a wavelength that allows the wavelength demultiplexer 32 to give a maximum transmission rate for the first optical signal. Also, the wavelength of the actually-received optical signal means the wavelength of the optical signal output from the wavelength demultiplexer 32. A difference detecting scheme employed by the difference detector 303 is described below in detail.

Figure 2A:
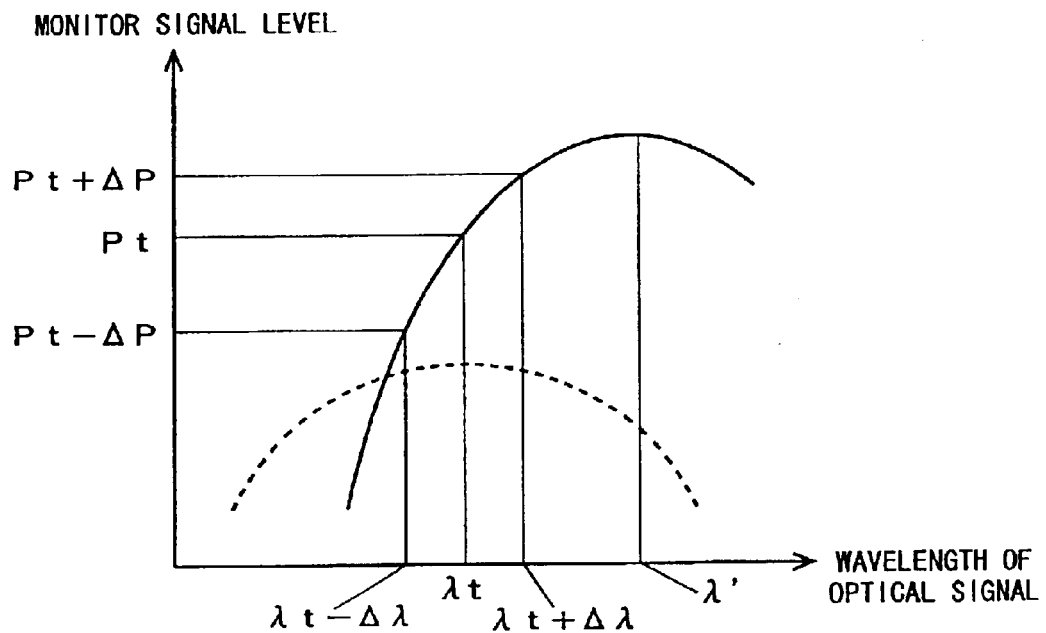
FIGS. 2A and 2B are illustrations each showing the wavelength dependence of a monitor signal level and a transmission rate of one output terminal of a wavelength demultiplexer 32 according to the first embodiment.
Figure 2B:
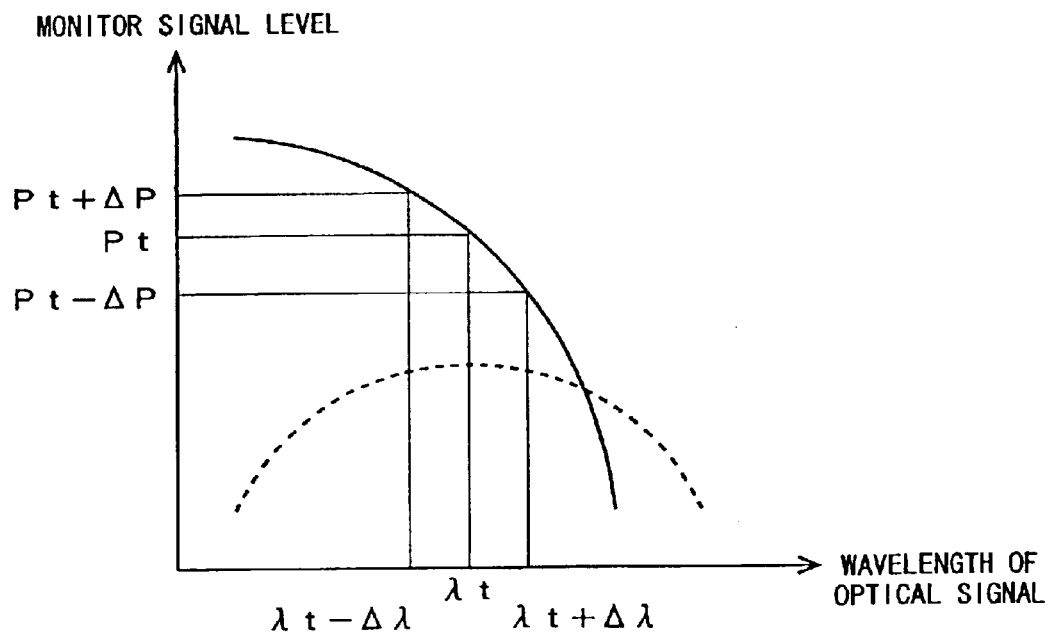

First, characteristics of a monitor signal level used for the difference detecting scheme of the present invention are described. FIGS. 2A and 2B are illustrations each showing the wavelength dependence of a monitor signal level and a transmission rate of one output terminal of the wavelength demultiplexer 32 according to the first embodiment. In each of FIGS. 2A and 2B, a dotted line denotes a dependence of the transmission rate of the wavelength demultiplexer 32 on wavelength. In FIGS. 2A and 2B, it is assumed, for example, that the maximum transmission rate is given at a wavelength λt, which is therefore taken as the above-described desired wavelength. On the other hand, a solid line denotes a dependence of a power level of the monitor signal extracted by the filter 302.

As illustrated in FIGS. 2A and 2B, a wavelength that gives a value of a maximum monitor signal level (λ' illustrated in FIG. 2A, for example) is deviated from the desired wavelength λt that gives the maximum transmission rate of the wavelength demultiplexer 32. Therefore, a phenomenon can be observed in the vicinity of the desired wavelength λt such that the monitor signal level shows a monotonous increase (FIG. 2A) or a monotonous decrease (FIG. 2B) This phenomenon is described in detail in "Study on specification of optical devices for WDM/SCM optical transmission system using direct modulation", Ikushima et al., Technical Report of IEICE (The Institute of Electronics, Information and Communication Engineers), OCS99-63(1999-09)).

The wavelength dependence of the monitor signal level can be known in advance by calculation or measurement of the wavelength dependence of the transmission rate of the wavelength demultiplexer 32, the frequency of the monitor signal, and the amount of optical frequency modulation in the optical signal (wavelength chirp amount). The characteristics of the wavelength chirp in the optical signal is determined by the electrical-optical converter to be applied (for example, the electrical-optical converter 104 in FIG. 1). It is also known in advance which characteristics of either those illustrated in FIG. 2A or those in FIG. 2B the wavelength dependence has. Therefore, by using the wavelength dependence of the above monitor signal level, the above difference can be detected.

For example, in FIG. 2A, when the monitor signal level is increased by ΔP from a reference level Pt corresponding to the desired wavelength λt, the wavelength of the optical signal is also increased by λt from the desired wavelength λt. Conversely, when the monitor signal level is decreased by ΔP from the reference level Pt, the wavelength of the optical signal is also decreased by λt from the desired wavelength λt. As such, based on the relation illustrated in FIGS. 2A and 2B, a difference ΔP between the level of the monitor signal extracted by the filter 302 and the predetermined reference level Pt is detected. With this detection, a difference between the desired wavelength λt and the wavelength of the actual optical signal can be easily detected.

Here, the reference level Pt of the difference detector 303 is given by the following equation 1.

$$Pt = \frac{1}{2} Z_0 \eta^2 (mP_0)^2 \left[ \left\{ T + \frac{\partial T}{\partial \lambda}\left(-\frac{\lambda^2}{c}\Delta F\right) \Delta Ib\cos\phi \right\}^2 + \left\{ \frac{\partial T}{\partial \lambda}\left(-\frac{\lambda^2}{c}\Delta F\right) \Delta Ib\sin\phi \right\}^2 \right]$$ (equation 1)

Here, ΔF is a wavelength chirp amount of an optical signal output from the electrical-optical converter 104. Zo is an input impedance of the optical-electrical converter 301. η is a conversion efficiency of the optical-electrical converter 301. Po is a power of an optical signal supplied to the optical-electrical converter 301. m is an optical modulation factor of a monitor signal. T is a transmission rate of the wavelength demultiplexer 32. λ is a wavelength of the optical signal. c is the speed of light. ΔIb is a bias current at a threshold of the electrical-optical converter 104. φ is a phase difference between an intensity-modulated component and an optical frequency-modulated component in the optical signal.

As described above, the first receiving section 311 detects a wavelength difference between the desired wavelength and the actual wavelength. Note that the operation of the k-th receiving section 31k is similar to that of the first receiving section 311. The information about the difference values detected by the first to N-th receiving sections 311 through 31N are supplied to the electrical-optical converter 331.

Returning to the descriptions of the operation of the wavelength division multiplex transmission system illustrated in FIG. 1, the electrical-optical converters 331 through 33N each convert the electrical signal including the above-described information about the difference value output from the first through N-th receiving sections to first through N-th upstream optical signals, respectively. Here, these optical signals output from N electrical-optical converters 331 through 33N have difference wavelengths. The wavelength multiplexer 33 wavelength-multiplexes these first through N-th upstream optical signals. An upstream optical signal obtained by the wavelength-multiplexing process is supplied through the second optical transmission path 22 to the wavelength demultiplexer 14 of the transmission apparatus. The wavelength demultiplexer 14 wavelength-demultiplexes the received optical signal to output the first through N-th upstream optical signals from output terminals. These output terminals of the wavelength demultiplexer 14 are respectively connected to N optical-electrical converters 151 through 15N for receiving the first through N-th upstream optical signals. The optical-electrical converter 151 converts the received optical signal to an electrical signal for output to the wavelength controller 121. Note that the other optical-electrical converters 152 through 15N operate in a manner similar to that of the optical-electrical converter 151.

The first wavelength converter 121 controls the electrical-optical converter 104 based on the information about the difference value included in the received electrical signal. That is, the first wavelength converter 121 adjusts the wavelength of the optical signal output from the electrical-optical converter 104 so that the level of the electrical signal output from the difference detector 303 has a predetermined value. Thus, the wavelength is stabilized at the predetermined value.

As described above, in the wavelength division multiplex transmission system according to the first embodiment, the wavelength is controlled by using the transmission rate characteristics of the wavelength demultiplexer for data transmission. Therefore, a wave control can be achieved by a cost-effective system structure without an optical filter dedicated to wavelength control. Furthermore, the wavelength of the optical signal which has passed through the wavelength demultiplexer is detected. Therefore, it is possible to perform a wavelength control in consideration of the wavelength dependence of the wavelength demultiplexer. Thus, a more stabilized wavelength division multiplex transmission system can be provided.

Figure 3:
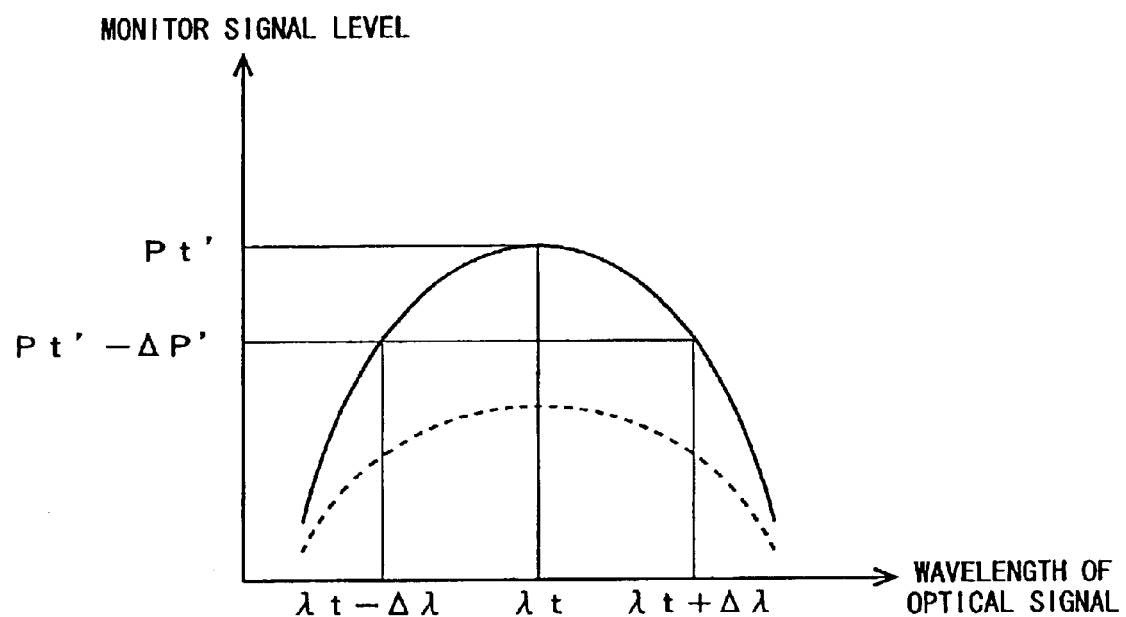
FIG. 3 is an illustration showing the wavelength dependence of the monitor signal level when a signal without wavelength chirp is used as a monitor signal.

In the present embodiment, the monitor signal is a sine wave signal. Such a monitor signal causes wavelength chirp in the light output from the electrical-optical converter 104. As a result, as illustrated in FIGS. 2A and 2B, a deviation occurs between the wavelength which gives the maximum value of the monitor signal level ($\lambda'$ in FIG. 2A) and the wavelength which gives the maximum transmission rate of the wavelength demultiplexer 32 ($\lambda t$ in FIG. 2A). With such a deviation, a differential wavelength can be easily detected. However, if the monitor signal is not a sine wave signal but a signal which does not cause wavelength chirp in the light output from the electrical-optical converter 104, $\Delta F=0$ in the above equation 1. In this case, no deviation occurs, and the wavelength dependence of the monitor signal level becomes as denoted by a solid line in FIG. 3 (note that a dotted line in FIG. 3 denotes a wavelength dependence of the transmission rate of the wavelength demultiplexer 32). With no deviation, even if the data signal level has been detected as $Pt'-\Delta P'$, it is difficult to determine whether the wavelength $\lambda t$ of the optical signal has been increased or decreased by $\Delta\lambda$. Thus, with such detection results, it is difficult to accurately detect the wavelength difference.

On the other hand, as illustrated in FIGS. 2A and 2B, the graph of the wavelength dependence of the monitor signal level in the present embodiment shows the above-described deviation. Thus, the wavelength of the optical signal can be easily determined. Note that a signal that can be used as the monitor signal is not limited to a sine wave signal but, in general, can be any signal whose amplitude changes in time are constant. For example, a triangular wave or a square wave can be used as the monitor signal, as long as amplitude changes in time are constant. Furthermore, a signal composed of a plurality of sine waves can also be used as the monitor signal.

Figure 4A:
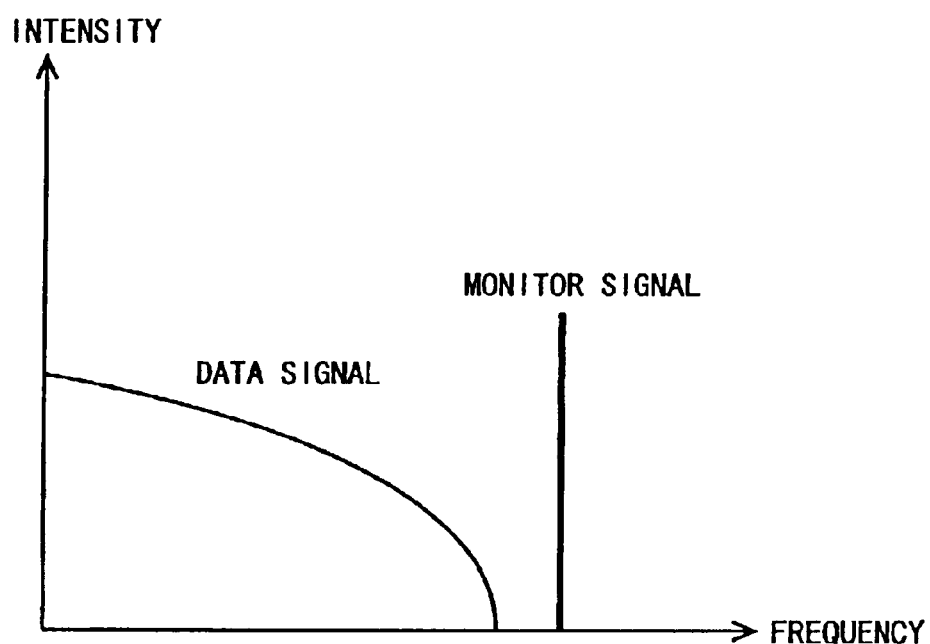
FIGS. 4A and 4B are illustrations showing exemplary schemes of frequency-multiplexing a data signal and a monitor signal according to the first embodiment.
Figure 4B:
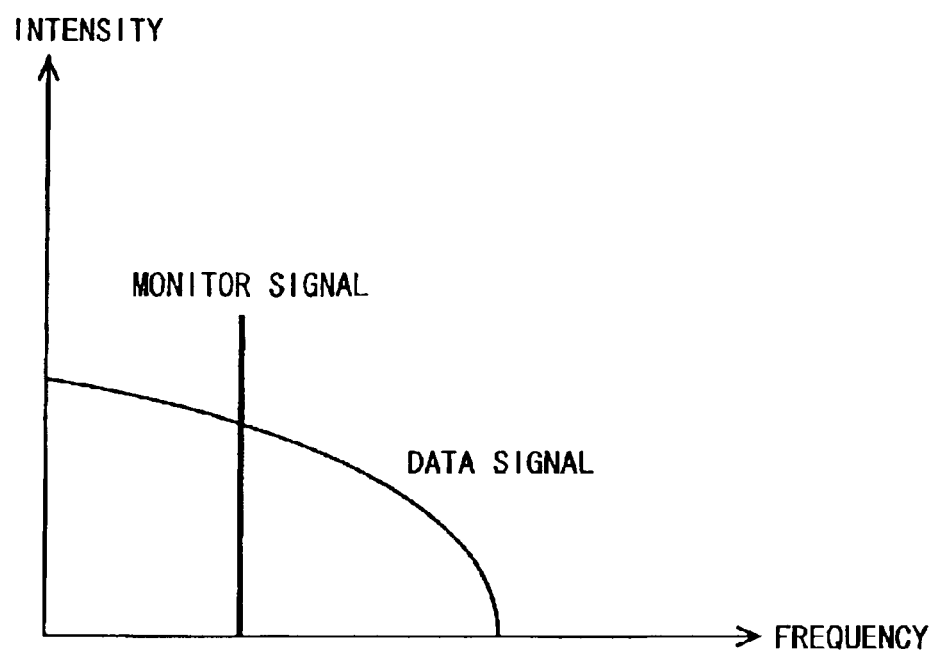

Also, any scheme of frequency-multiplexing the data signal and the monitor signal employed by the frequency multiplexer 103 can be used. FIGS. 4A and 4B are illustrations showing exemplary schemes of frequency-multiplexing the data signal and the monitor signal according to the first embodiment. The frequency-multiplexing scheme may be, as illustrated in FIG. 4B, for example, one in which the monitor signal is frequency-multiplexed within the frequency band of the data signal. Alternatively, as illustrated in FIG. 4A, the scheme may be one in which the monitor signal is frequency-multiplexed outside the frequency band of the data signal. The frequency-multiplexing scheme is selected depending on the signal quality required for the data signal and the monitor signal, the performance of each device composing the optical transmitting means, or the like. In general, for the purpose of reducing an effect of the monitor signal to the data signal, a frequency-multiplexing process is preferably performed as illustrated in FIG. 4A.

As described above, according to the first embodiment, a wavelength control is performed by using the transmission characteristics of the wavelength demultiplexer 32 which are originally required for transmitting a data signal in the wavelength division multiplex transmission system, without requiring an expensive optical device, such as an optical filter, dedicated to the wavelength control. Therefore, it is possible to greatly reduce cost associated with the wavelength control.

(Second Embodiment)

Figure 5:
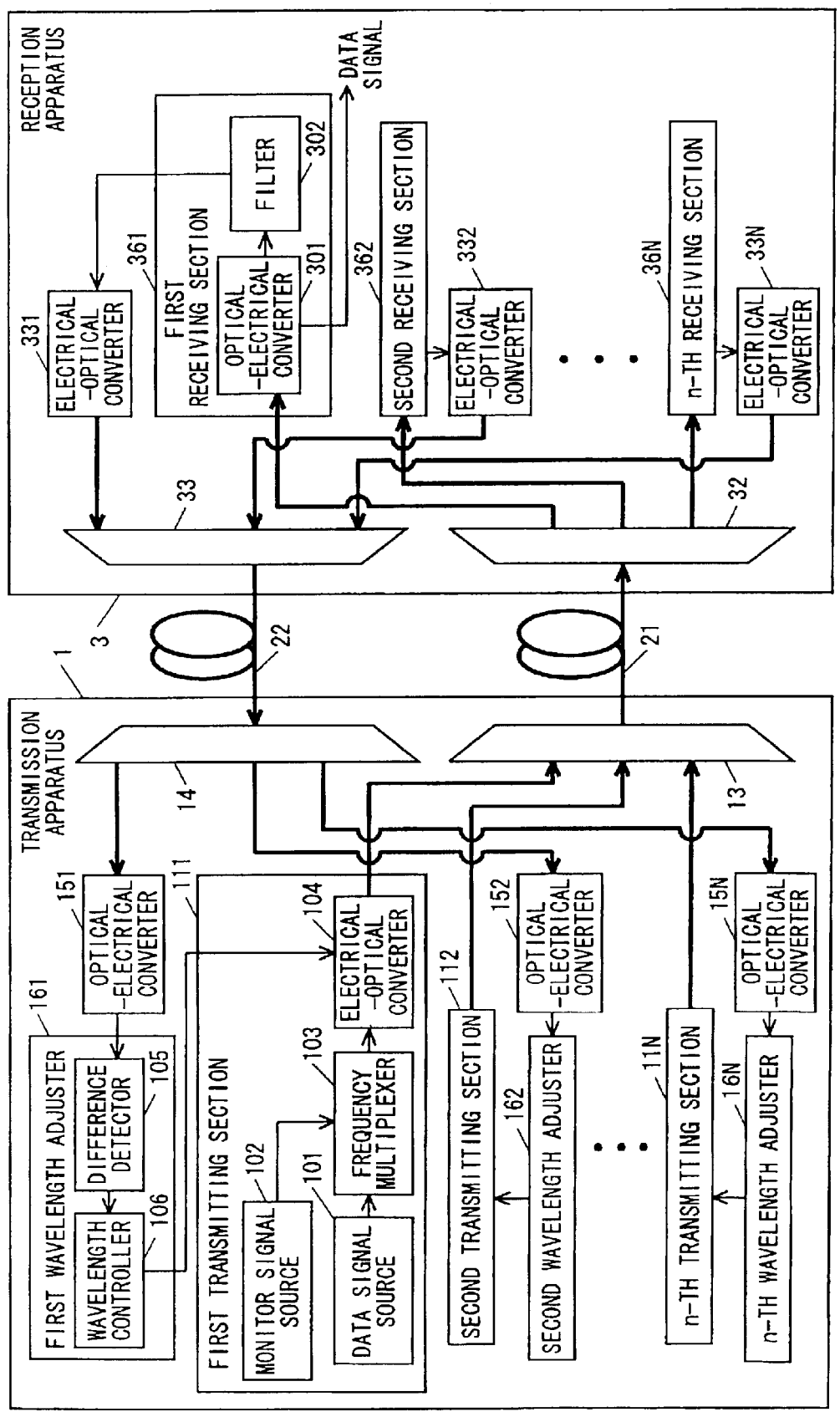
FIG. 5 is a block diagram illustrating the configuration of a wavelength division multiplex transmission system according to a second embodiment.

Next, a wavelength division multiplex transmission system according to a second embodiment is described below. FIG. 5 is a block diagram illustrating the configuration of the wavelength division multiplex transmission system according to the second embodiment. In FIG. 5, components similar in operation to those according to the first embodiment are provided with the same reference numerals, and are briefly described herein.

In FIG. 5, the wavelength division multiplex transmission system includes the transmission apparatus 1, the first and second optical transmission paths 21 and 22, and the reception apparatus 3. The transmission apparatus 1 includes the first through N-th transmitting sections 111 through 11N, first through N-th wavelength adjusters 161 through 16N, the wavelength multiplexer 13, the wavelength demultiplexer 14, and the N optical-electrical converters 151 through 15N. The reception apparatus 3 includes first through N-th receiving sections 361 through 36N, the wavelength demultiplexer 32, the N electrical-optical converters 331 through 33N, and the wavelength multiplexer 33.

The first through N-th transmitting sections 111 through 11N are similar in structure to those in FIG. 1. The first wavelength adjuster 161 includes a difference detector 105 and a wavelength controller 106. The first receiving section 361 includes the optical-electrical converter 301 and the filter 302. Furthermore, note that, although not shown, the structures of the first wavelength adjuster 161 and the first receiving section 361 can be applied to those of a k-th (k is an integer from 2 to N) transmitting section 16k and a k-th receiving section 36k, respectively.

The operation of the wavelength division multiplex transmission system according to the second embodiment is described below. As mentioned above, the components similar in operation to those in the first embodiments are briefly described herein. The first transmitting section 111 frequency-multiplexes a data signal to be transmitted and a monitor signal of a predetermined frequency for outputting an optical modulated signal. The wavelength multiplexer 13 wavelength-multiplexes first through N-th downstream optical signals output from the first through N-th transmitting sections 111 through 11N. An optical signal obtained by the wavelength-multiplexing process is transmitted via the first optical transmission path 21. The wavelength demultiplexer 32 wavelength-demultiplexes the optical modulated signal transmitted via the first optical transmission path 21, and then outputs the first through N-th downstream signals to the first through N-th receiving sections 361 through 36N, respectively.

In the first receiving section 361, the optical-electrical converter 301 converts a first optical signal supplied by the wavelength demultiplexer 32 to an electrical signal. The filter 302 extracts the monitor signal from the electrical signal obtained by the optical-electrical converter 301 for output.

The electrical-optical converters 331 through 33N convert monitor signals, which are electrical signals, supplied by the first through N-th receiving sections 361 through 36N, respectively, to optical signals. The wavelength multiplexer 33 wavelength-multiplexes the first through N-th upstream optical signals supplied by the electrical-optical converters 331 through 33N. An upstream optical signal obtained by the wavelength multiplexing process is supplied via the second optical transmission path 22 to the wavelength demultiplexer 14 of the transmission apparatus 1. The wavelength demultiplexer 14 wavelength-demultiplexes the received optical signal, and then outputs the first through N-th upstream optical signals from output terminals to the N optical-electrical converters 151 through 15N. The optical-electrical converters 151 through 15N each convert the received optical signal to an electrical signal for output to the first through N-th wavelength adjusters 161 through 16N.

The difference detector 105 of the first wavelength adjuster 161 is similar to the difference detector 303 illustrated in FIG. 1. That is, the difference detector 105 compares a signal level of the received monitor signal with a predetermined reference level to detect a wavelength difference between a desired wavelength and the wavelength of the actually-received monitor signal. Based on the information about the difference value output from the difference detector 105, the wavelength controller 106 adjusts the wavelength of the optical signal output from the electrical-optical converter 104 so that the level of the electrical signal output from the difference detector 105 has a predetermined value. With this, the wavelength is stabilized at the predetermined value.

As described above, according to the second embodiment, the difference detector 105 is placed at the transmission apparatus side. Therefore, the reference level Pt set in advance in the difference detector can be changed at the transmitting side. In the wavelength division multiplex transmission system illustrated in FIG. 5 including a control station (transmission apparatus) and a terminal (reception apparatus) according to the second embodiment, the reference level can be changed not at the terminal side but at the control station side. Thus, such changes can be easily made.

In the above first and second embodiments, the difference detector outputs the wavelength information indicative of the wavelength difference value. Alternatively, in other embodiments, information indicative of a wavelength value itself can be output. That is, the difference detector may output a value of $\Delta\lambda$ illustrated in FIGS. 2A and 2B or a value of $\lambda t+\Delta\lambda$. Note that, even in a case of outputting the value of $\lambda t+\Delta\lambda$, the wavelength controller can control the electrical-optical converter in a manner similar to that in a case of outputting the differential value.

Furthermore, in the above first and second embodiments, a wavelength multiplexing process is also performed in upstream communications (communications from the reception apparatus side to the transmission apparatus side). This is not meant to be restrictive. For example, the electrical signals output from the first through N-th receiving sections 311 through 311N may be frequency-multiplexed before conversion to an optical signal. In this case, however, the monitor signals used in the first through N-th receiving sections 111 through 111N are set to have different frequencies. Moreover, the communications path is not restricted to a communications path for optical communications. Upstream communications can be performed wirelessly.

(Third Embodiment)

Figure 6:
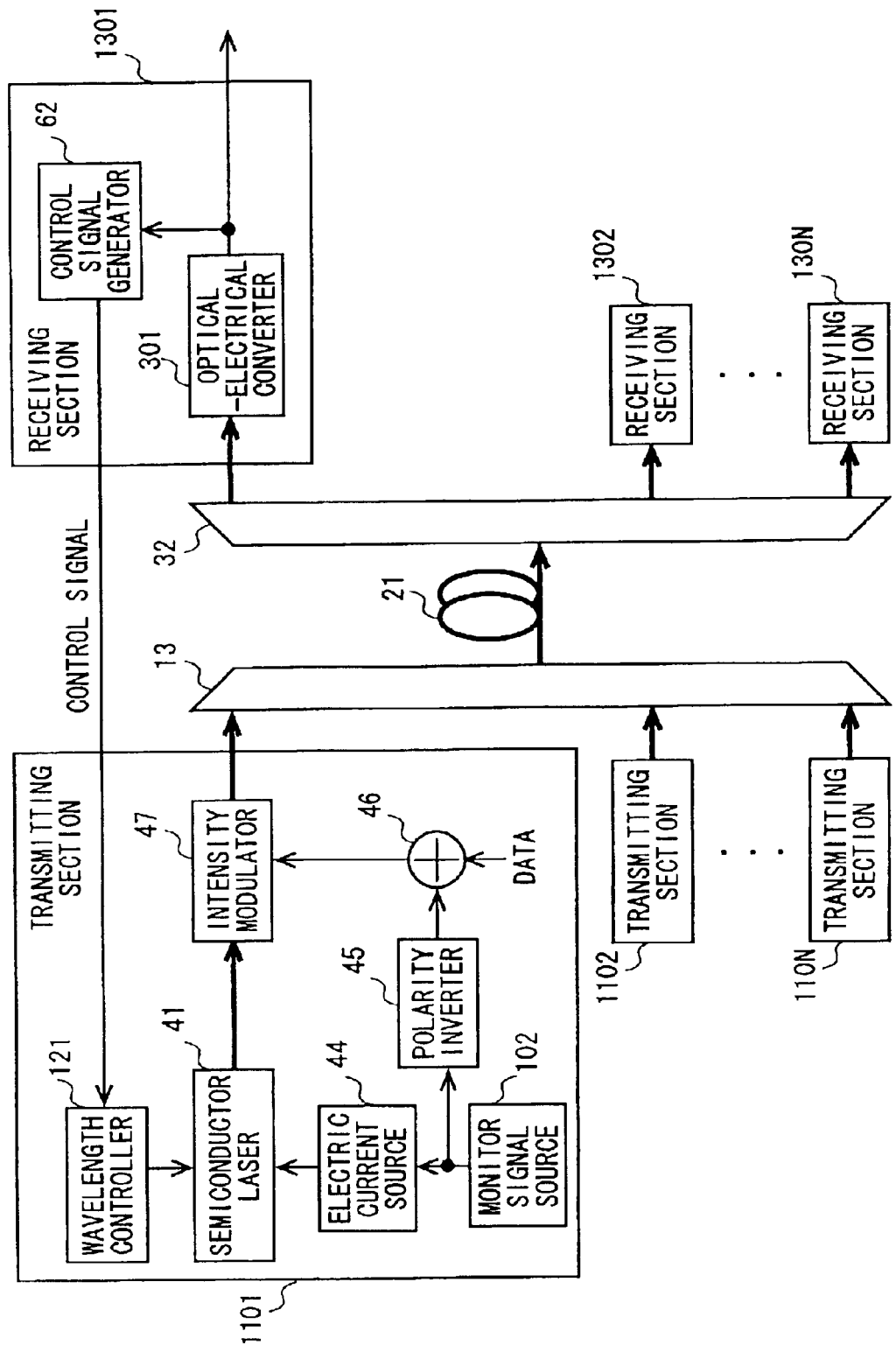
FIG. 6 is a block diagram illustrating the configuration of a wavelength division multiplex transmission system according to a third embodiment of the present invention.

FIG. 6 is a block diagram illustrating the configuration of a wavelength division multiplex transmission system according to a third embodiment of the present invention. The wavelength division multiplex transmission system includes N transmitting sections 1101 through 110N, a wavelength multiplexer 13, an optical transmission path 21, a wavelength demultiplexer 32, and N receiving sections 1301 through 130N. The transmitting section 1101 includes a semiconductor laser 41, a wavelength controller 121, a monitor signal source 102, a current source 44, a polarity inverter 45, a multiplexer 46, and an intensity modulator 47. The receiving section 1301 includes an optical-electrical converter 301 and a control signal generator 62.

With reference to FIG. 6, the function of each component according to the present embodiment is described below.

The semiconductor laser 41 outputs light. The wavelength controller 121 controls a center wavelength $\lambda_0$ of the optical signal output from the semiconductor laser 41. This control is performed based on a control signal supplied to the wavelength controller 121. The monitor signal source 102 outputs a sine wave signal as a monitor signal. The current source 44 supplies the semiconductor laser 41 with a current having the sine wave signal output from the monitor signal source 102 and a predetermined bias value superposed thereon. The polarity inverter 45 inverts the polarity of the sine wave signal output from the monitor signal source 102. As the polarity inverter 45, a phase shifter for shifting a phase by 180 degrees can be used. The multiplexer 46 multiplexes the sine wave signal whose polarity has been inverted by the polarity inverter 45 and the data signal. The intensity modulator 47 intensity-modulates the light output from the semiconductor laser 41 with a signal output from the multiplexer 46. This process is performed so that the amplitude of an intensity-modulated component caused by the sine wave signal at the semiconductor laser 41 coincides with that at the intensity modulator 47. The transmitting sections 1102 through 110N are similar in structure and function to the first transmitting section 1101. These transmitting sections 1101 and 110N output optical signals of different wavelengths.

The wavelength multiplexer 13 wavelength-multiplexes the optical signals output from the transmitting sections 1101 through 110N. An optical signal obtained through the wavelength multiplexing process by the wavelength multiplexer 13 is supplied via the optical transmission path 21, such as an optical fiber, to the wavelength demultiplexer 32. The wavelength demultiplexer 32 demultiplexes the wavelength-multiplexed optical signal into optical signals of different wavelengths for output to the receiving sections 1301 through 130N.

The optical-electrical converter 301 converts the optical signal obtained through the wavelength demultiplexing process performed by the optical-electrical converter 301 to an electrical signal. The control signal generator 62 detects the above-described sine wave signal (that is, monitor signal) in the electrical signal supplied by the optical-electrical converter 301 (more accurately, the control signal generator 62 detects an intensity-modulated component caused by the sine wave signal). The receiving sections 1302 through 130N are similar in structure and function to the receiving section 1301. These receiving sections 1301 through 130N are supplied with optical signals of different wavelengths.

The basic principle of the wavelength division multiplex transmission system according to the present invention is described below.

Figure 7A:
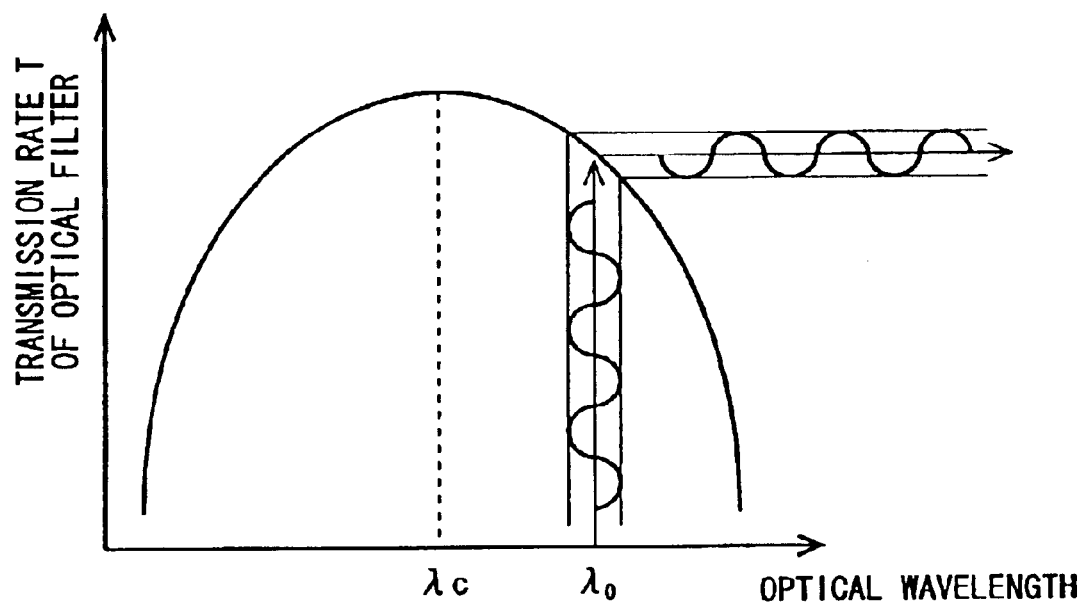
FIGS. 7A and 7B are illustrations for describing a relationship between transmission characteristics of a wavelength demultiplexer and a process performed by the wavelength demultiplexer of converting a wavelength change into an intensity change.

Consider a case where an optical signal passes through an output terminal of the wavelength demultiplexer having transmission characteristics as illustrated in FIG. 7A. When the wavelength of this optical signal has been modulated with a sine wave having a center wavelength of $\lambda_0$, that is, when wavelength changes in time can be represented by the following equation 2, a deviation between a transmission center wavelength $\lambda c$ and a center frequency $\lambda_0$ of the optical signal causes a conversion of wavelength changes of the optical signal to intensity changes thereof.

$$\lambda = \lambda_0 + \Delta\lambda \qquad \text{(equation 2)}$$
$$= \lambda_0 + A\cos(2\pi ft)$$

The above can be described as follows. That is, the transmission characteristics of the wavelength demultiplexer can be developed as in the following equation 3 by taking the wavelength $\lambda_0$ as the center.

$$T(\lambda) = T(\lambda_0) + \frac{dT}{d\lambda}\bigg|_{\lambda=\lambda_0} \cdot \Delta\lambda + \ldots \qquad \text{(equation 3)}$$

Therefore, when a power of the optical signal before being supplied to the wavelength demultiplexer is taken as $P_{in}$, a power $P_{out}$ of the optical signal after being passed through the wavelength demultiplexer can be found by the following equation 4.

$$P_{out} = T \cdot P_{in} \qquad \text{(equation 4)}$$
$$= T(\lambda_0) \cdot P_{in} + \frac{dT}{d\lambda}\bigg|_{\lambda=\lambda_0} \cdot P_{in} \cdot A\cos(2\pi ft) + \ldots$$

In the above equation 4, the second term indicates that the optical signal after passing through the wavelength demultiplexer has an intensity-modulated component having the same frequency as that of the wavelength change, and that the amplitude of the optical signal is proportional to a first-order differential component of the transmission rate of the wavelength demultiplexer.

Figure 7B:
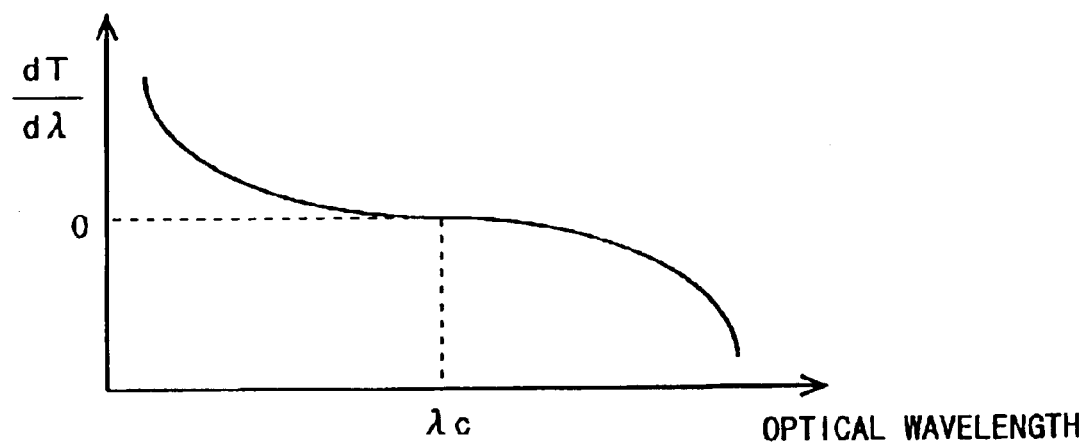

FIG. 7B illustrates the first-order differential component of the transmission rate of the wavelength demultiplexer having the characteristics illustrated in FIG. 7A. When the wavelength demultiplexer shows transmission characteristics symmetric with respect to the transmission center wavelength $\lambda_c$, the first-order differential component of the transmission rate at the transmission center wavelength $\lambda_c$ is 0. Therefore, the wavelength of the optical signal is modulated in advance with a sine wave. Then, after the optical signal passes through the wavelength demultiplexer, an intensity-modulated component of the same frequency of the sine wave is detected. Then, the center wavelength $\lambda_o$ of the optical signal is controlled so that the amplitude of the intensity-modulated component is 0. With this control, it is possible to coincide the center wavelength $\lambda_o$ of the optical signal and the transmission center wavelength $\lambda_c$ of the wavelength demultiplexer with each other.

Signal waveforms at each component are described below with reference to FIGS. 8A through 8F, and 9A and 9B. When a waveform of a signal output from the monitor signal source 102 is as illustrated in FIG. 8A, light output from the semiconductor laser 41 is intensity-modulated as illustrated in FIG. 8B. At the same time, the wavelength of the light output from the semiconductor laser 41 is also modulated, and changes in wavelength with time are as illustrated in FIG. 9A. Hereinafter, it is assumed that the wavelength is increased as the amount of current injected to the semiconductor laser 41 is increased, and that there is no phase difference between the intensity-modulated component and the wavelength modulation component.

On the other hand, a waveform of a signal output from the polarity inverter 45 is as illustrated in FIG. 8C, which is the inverse of the waveform of FIG. 8A. When the signal output from the polarity inverter 45 is multiplexed with the data to be transmitted as illustrated in FIG. 8D, a waveform of a signal supplied to the intensity modulator 47 becomes as illustrated in FIG. 8E. When this signal is used to modulate the light output from the semiconductor laser 41, the components intensity-modulated with the sine wave signal are cancelled and, as illustrated in FIG. 8F, only the components intensity-modulated with the data remains. Note that the wavelength information is not affected in the intensity modulator 47. Therefore, as illustrated in FIG. 9B, the wavelength changes given by the semiconductor laser 41 remain. Thus, an optical signal whose wavelength has been modulated with a sine wave can be obtained.

The wavelength demultiplexer 32 has the output terminals whose transmission characteristics are as illustrated in FIG. 7A. When there is a deviation between the center wavelength $\lambda_0$ of the optical signal and the transmission center wavelength $\lambda_c$ of the wavelength demultiplexer 32, an intensity-modulated component occurs which has a frequency equal to that of the sine wave signal and whose amplitude is proportional to the first-order differential component of the transmission rate. This intensity-modulated component is hereinafter referred to as a transmission rate differential signal. Note that the frequency distribution of the sine wave signal and the data is preferably such that the frequency of the sine wave signal is sufficiently low as illustrated in FIG. 10 (or high). With such frequency distribution, the sine wave signal can be eliminated by a filter (not shown in FIG. 6) at the receiving side, thereby not affecting the receive data.

Figures 11, 12:
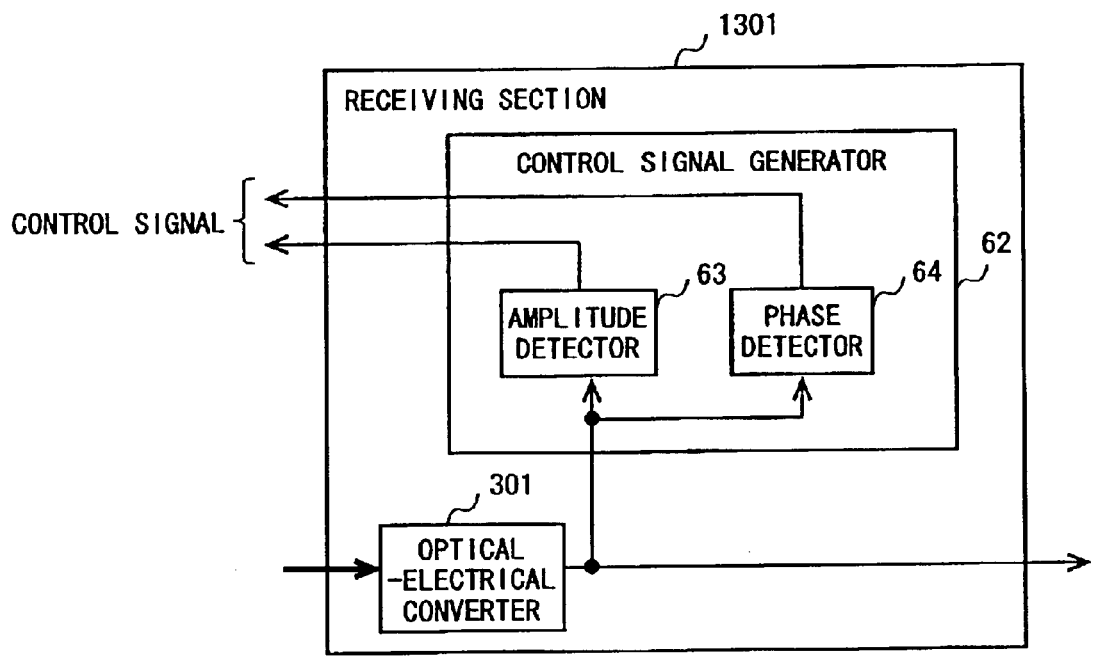
FIG. 11 is a block diagram illustrating the structure of a receiving section according to the third embodiment of the present invention.
FIG. 12 is an illustration showing a relation between an optical wavelength and a transmission rate differential signal in the third embodiment of the present invention.

The control signal generator 62 includes, as illustrated in FIG. 11, an amplitude detector 63 for detecting an amplitude of the transmission rate differential signal and a phase detector 64 for detecting a phase of the transmission rate differential signal. It is defined herein that the sine wave signal and the transmission rate differential signal are in phase when the sign of the transmission rate differential signal is positive, while these signals are in opposite phase when the sign thereof is negative. At this time, a relation among $dT/d\lambda$, the amplitude and phase of the transmission rate differential signal, and the center wavelength $\lambda_0$ of the optical signal is as illustrated in FIG. 12. The information about the amplitude and phase of the transmission rate differential signal detected by the control signal generator 62 is sent as the control signal to the wavelength controller 121. The wavelength controller 121 then controls the wavelength of the light output from the semiconductor laser 41 so that the amplitude of the transmission rate differential signal is 0. With this control, it is possible to coincide the center wavelength $\lambda_0$ of the optical signal with the center wavelength $\lambda_c$ of the wavelength demultiplexer 32. In this control, whether to increase or decrease the wavelength is determined based on the information about the phase of the transmission rate differential signal. That is, the wavelength is increased if the optical signal and the transmission rate differential signal are in phase. If these signals are in opposite phase, the wavelength is decreased. If it is assumed that the wavelength is decreased as the amount of current injected to the semiconductor laser 41 is increased, the above control is made reversed. That is, the wavelength is decreased if the optical signal and the transmission rate differential signal are in phase and, if these signals are in opposite phase, the wavelength is increased.

The wavelength control performed by a general semiconductor laser can be made by using a scheme of controlling temperature. Some semiconductor lasers can perform the wavelength control with schemes other than the temperature control scheme. When one of such semiconductor lasers is used, the wavelength of light output from the laser can be controlled in a manner suitable for the semiconductor laser in use.

Figure 13:
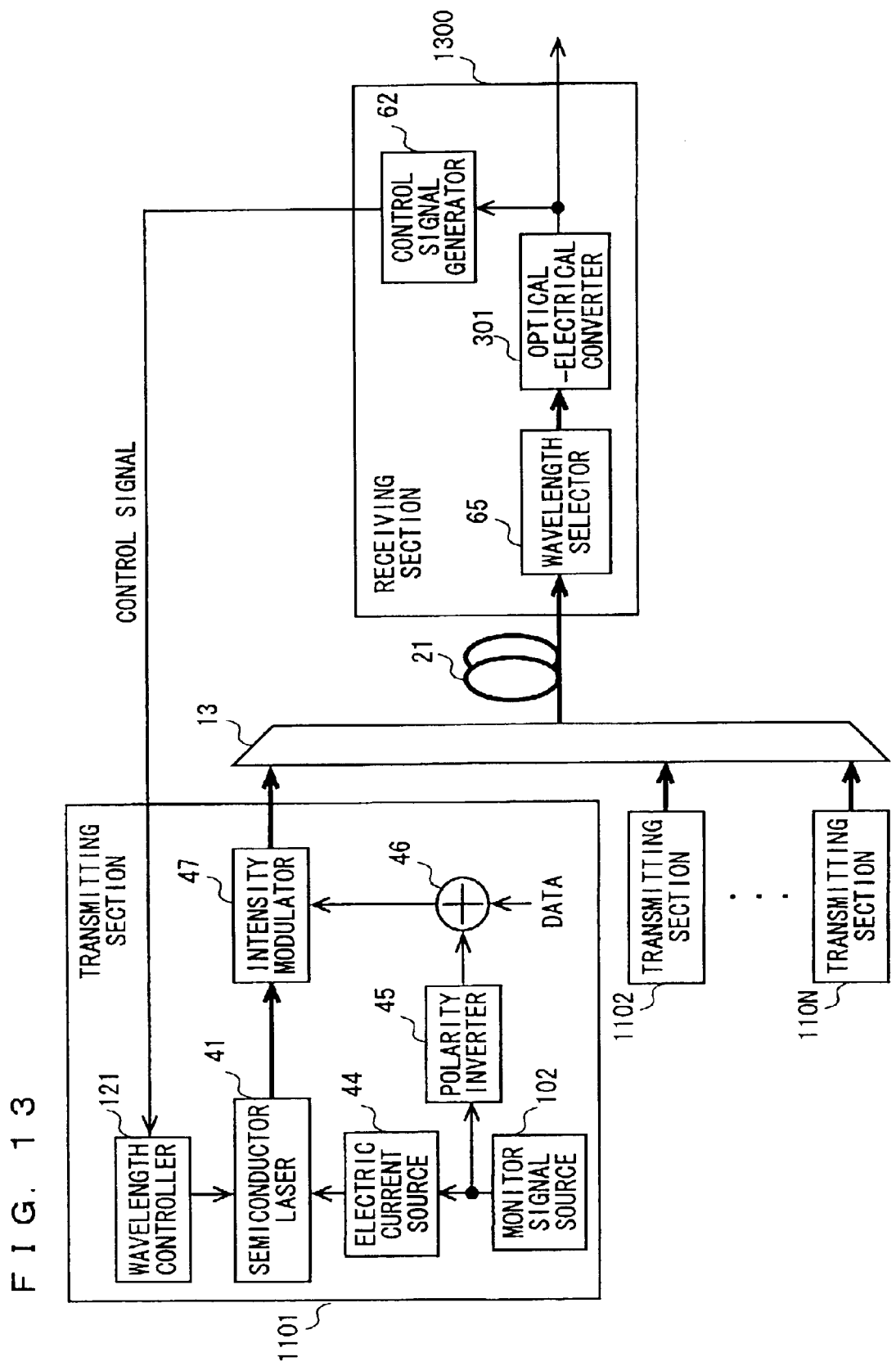
FIG. 13 is a block diagram illustrating an exemplary modification according to the third embodiment of the present invention.

Furthermore, the above discussion can be applied to the wavelength division multiplex transmission system having a structure as illustrated in FIG. 13, in which a wavelength selector 65 is provided, instead of the wavelength demultiplexer 32, for extracting only an optical signal of a desired wavelength from the wavelength-multiplexed optical signal.

In the present embodiment, blocks required to be added to general transmitting and receiving sections that do not perform a wavelength control are the wavelength controller 121, the monitor signal source 102, the polarity inverter 45, the multiplexer 46, and the control signal generator 62. All of these blocks can be implemented by inexpensive electric devices. Therefore, compared with the conventional wavelength division multiplex transmission system using a wavelength locker, which is an optical device, the present embodiment can be more cost-effective. Also, the control is performed so that the transmission center wavelength of the wavelength demultiplexer 32 (or the wavelength selector 65) coincides with the center wavelength of the optical signal. Therefore, even if the transmission center wavelength of the wavelength demultiplexer 32 (or the wavelength selector 65) is deviated from an initial state due to temperature or the like, the control can be performed so as not to cause an excessive optical loss.

As described above, according to the present embodiment, a cost-effective wavelength division multiplex transmission system can be achieved without requiring any additional expensive optical devices.

(Fourth Embodiment)

Figure 14:
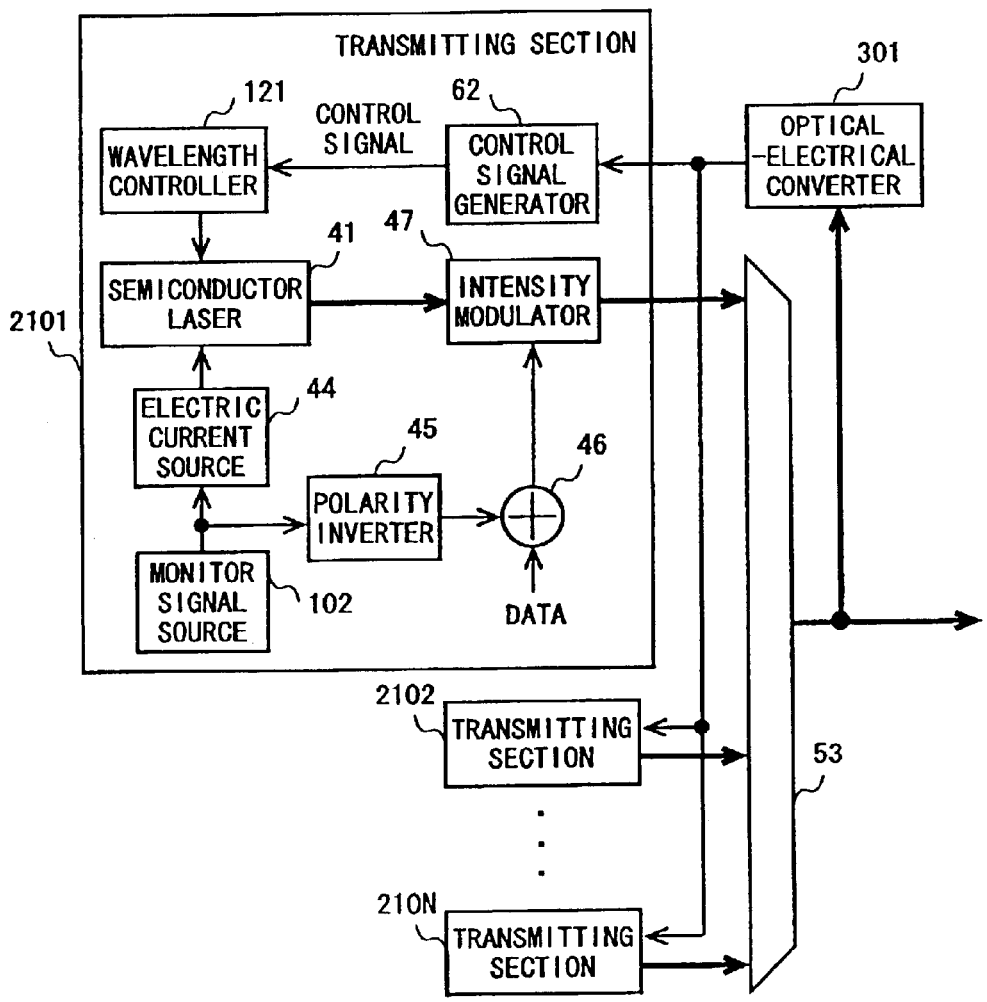
FIG. 14 is a block diagram illustrating the configuration of a fourth embodiment of the present invention.

FIG. 14 is a block diagram illustrating a wavelength division multiplex transmission system (optical transmission apparatus) according to a fourth embodiment of the present invention. This wavelength division multiplex transmission system includes transmitting sections 2101 through 210N, a wavelength multiplexer 53, and the optical-electrical converter 301. The transmitting section 2101 includes the semiconductor laser 41, the wavelength controller 121, the monitor signal source 102, the current source 44, the polarity inverter 45, the multiplexer 46, the intensity modulator 47, and a control signal generator 62. Note that, in FIG. 14, components similar in structure to those in FIG. 6 are provided with the same reference numerals, and are not described in detail herein.

A function of each component of the present embodiment is described below with reference to FIG. 14.

Figure 15:
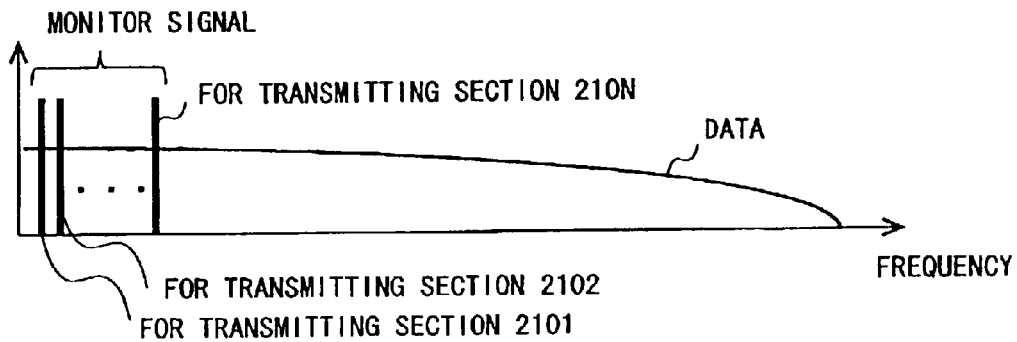
FIG. 15 is an illustration showing frequencies at which signals are located in the fourth embodiment of the present invention.

The semiconductor laser 41, the wavelength controller 121, the current source 44, the polarity inverter 45, the multiplexer 46, and the intensity modulator 47 are similar in function to those of the third embodiment. The monitor signal source 102 outputs sine wave signals, as with the third embodiment. However, the sine wave signals have different frequencies uniquely assigned to the respective transmitting sections 2101 through 210N. That is, as illustrated in FIG. 15, the sine wave signals have different frequencies for the transmitting sections. As with the third embodiment, any of these frequencies of the sine wave signals are set so as to be sufficiently low (or high), thereby not affecting the receive data.

The wavelength multiplexer 53 wavelength-multiplexes an optical signal output from the intensity modulator 47 with other optical signals of different wavelengths. Also, each input port of the wavelength multiplexer 53 serves as an optical filter for passing only signals in the vicinity of the wavelength of the optical signal transmitted from the corresponding transmitting section. Such a function of the wavelength multiplexer 53 can be generally implemented by an array waveguide grading (AWG) optical filter.

The optical-electrical converter 301 converts part of the optical signal output from the wavelength multiplexer 53 into an electrical signal. Unlike the third embodiment, the control signal generator 62 is provided inside the transmitting section 2101 for extracting a sine wave signal (transmission rate differential signal) of a frequency assigned to the transmitting section 2101 from the electrical signal output from the optical-electrical converter 301, and then transmitting information about the amplitude and phase of the extracted sine wave signal to the wavelength controller 121 as the control signal. Similarly, the transmitting sections 2102 through 210N each include a control signal generator (not shown) for extracting a sine wave signal of a frequency assigned to the respective transmitting sections.

A waveform control scheme and signal waveforms in the present embodiment are similar to those in the third embodiment, except for the frequency distribution of the sine wave signal described with reference to FIG. 15.

The present embodiment has the same advantages as those of the third embodiment. In addition, in the present embodiment, all components required for wavelength control can be gathered in the transmitting side, thereby allowing easy maintenance.

(Fifth Embodiment)

Figure 16:
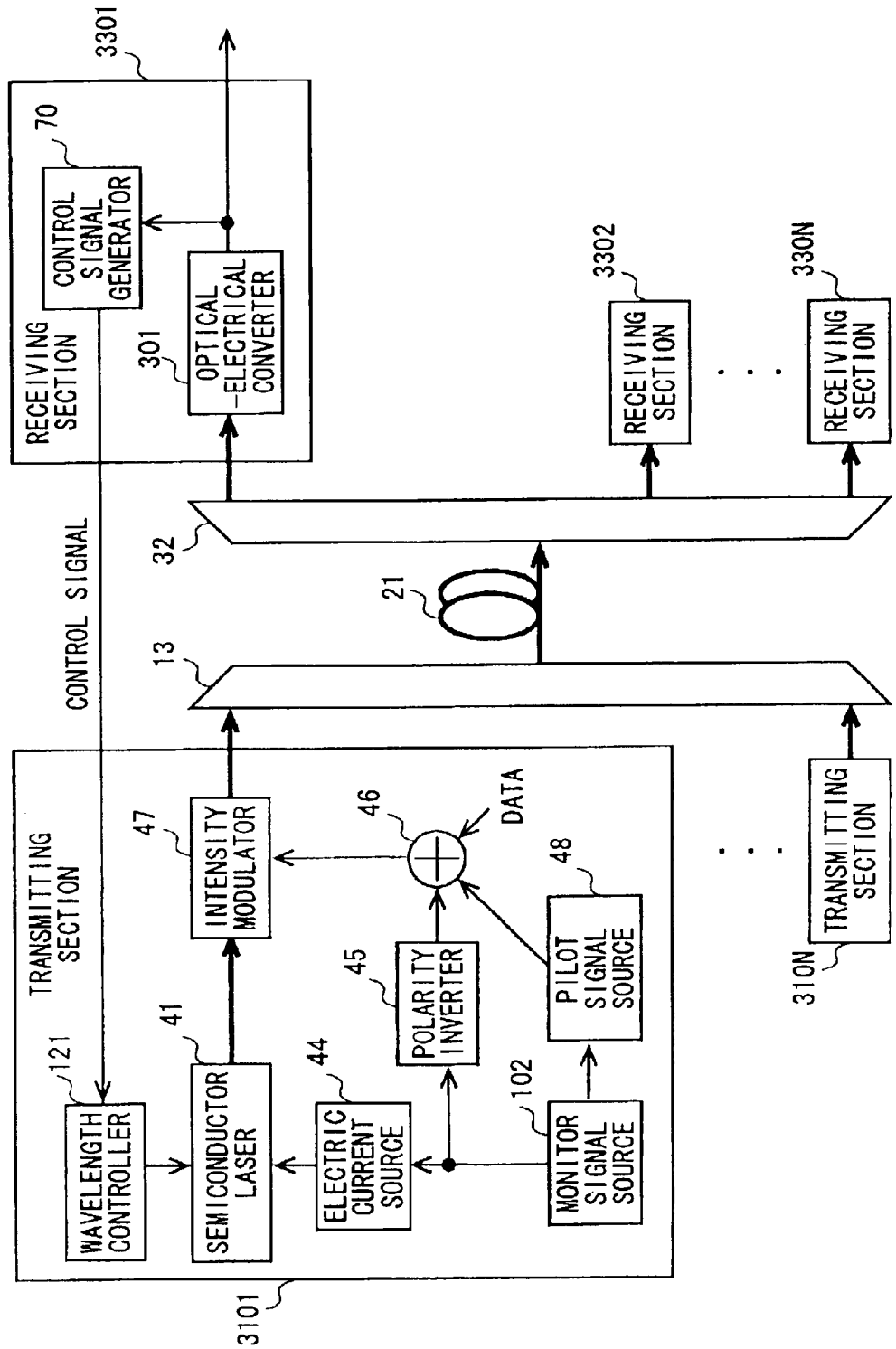
FIG. 16 is a block diagram illustrating the configuration of a fifth embodiment of the present invention.

FIG. 16 is a block diagram illustrating the configuration of a wavelength division multiplex transmission system according to a fifth embodiment of the present invention. This wavelength division multiplex transmission system includes transmitting sections 3101 through 310N, the wavelength multiplexer 13, the optical transmission path 21, the wavelength demultiplexer 32, and receiving sections 3301 through 330N. The transmitting section 3101 includes the semiconductor laser 41, the wavelength controller 121, the monitor signal source 102, the current source 44, the polarity inverter 45, the multiplexer 46, the intensity modulator 47, and a pilot signal source 48. The receiving section 3301 includes the optical-electrical converter 301 and a control signal generator 70. In FIG. 16, components similar to those in FIG. 6 are provided with the same reference numerals, and are herein not described in detail.

Figures 17, 18:
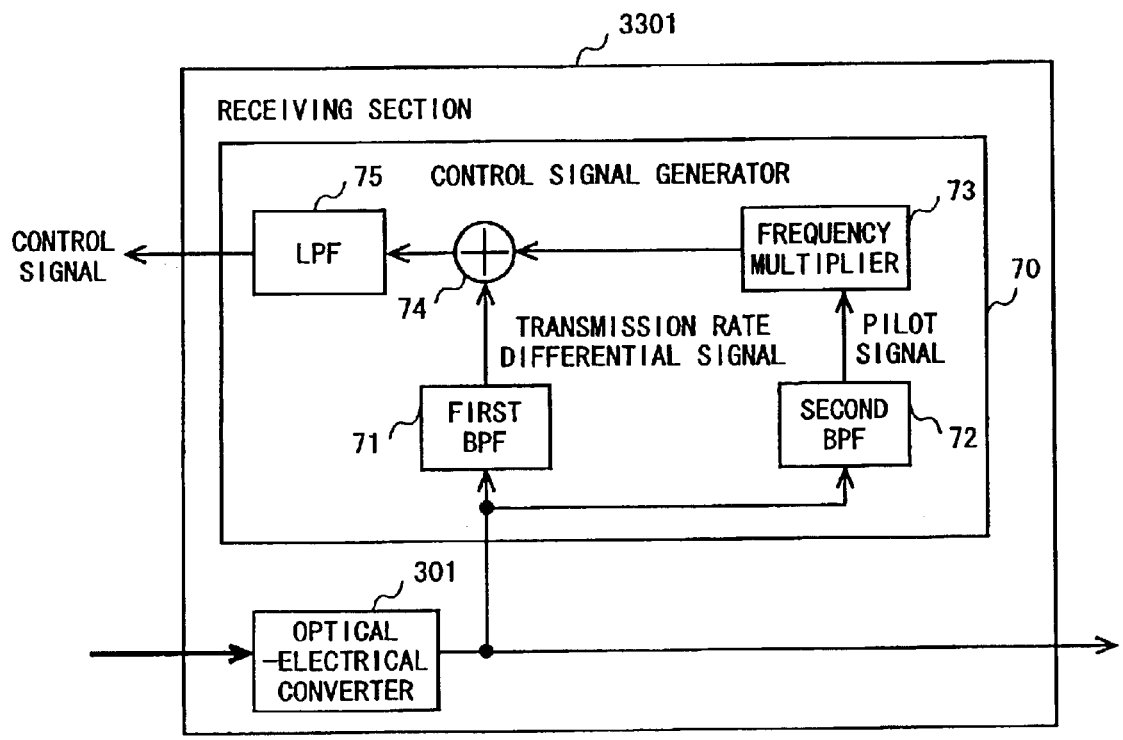
FIG. 17 is a block diagram illustrating the structure of a receiving section according to a fifth embodiment of the present invention.
FIG. 18 is an illustration showing a relation between an optical wavelength and a control signal according to the fifth embodiment of the present invention.

FIG. 17 is a block diagram illustrating the receiving section 3301. The control signal generator 70 includes a first band-pass filter 71, a second band-pass filter 72, a frequency multiplier 73, a multiplier 74, and a low-pass filter 75.

A function of each component of the wavelength division multiplex transmission system according to the present embodiment is described with reference to FIGS. 16 and 17.

Functions and signal waveforms of the semiconductor laser 41, the monitor signal source 102, the current source 44, and the polarity inverter 45 are similar to those in the third embodiment. The pilot signal source 48 has a frequency which is an integral submultiple of the frequency of the sine wave signal output from the monitor signal source 102. The pilot signal source 48 outputs a pilot signal whose phase is in synchronization with that of the sine wave signal. The multiplexer 46 multiplexes the polarity-inverted sine wave signal and the data along with the pilot signal. The intensity modulator 47 intensity-modulates light output from the semiconductor laser 41 with a signal output from the multiplexer 46. An optical signal output from the intensity modulator 47 is a signal intensity-modulated by a signal having the data and the pilot signal superposed thereon. This is because, in the optical signal, a component intensity-modulated with the sine wave signal has been cancelled. On the other hand, the wavelength is modulated with the sine wave signal, as with the third embodiment.

When there is a deviation between the transmission center wavelength $\lambda_c$ of the wavelength demultiplexer 32 and the center wavelength $\lambda_0$ of the optical signal, wavelength changes are converted to intensity changes, as with the third embodiment. Also, a transmission rate differential signal having a frequency equal to that of the sine wave signal occurs. The first band-pass filter 71 extracts the transmission rate differential signal from an electrical signal output from the optical-electrical converter 301. The second band-pass filter 72 extracts the pilot signal from the electrical signal output from the optical-electrical converter 301. The frequency multiplier 73 multiplies a frequency of the pilot signal so that the pilot signal has a frequency equal to that of the transmission rate differential signal. The multiplier 74 multiplies the transmission rate differential signal output from the first band-pass filter 71 by the pilot signal output from the frequency multiplier 73. The low-pass filter 75 extracts a direct-current component from a signal output from the frequency multiplier 73. This direct-current component is fed back as a control signal to the wavelength controller 121.

The pilot signal is made in synchronization with the sine wave signal at the transmitting side for output. Therefore, when the sign of the transmission rate differential signal is positive (when the center wavelength $\lambda_0$ of the optical signal is shorter than the transmission rate center wavelength $\lambda_c$), the pilot signal and the transmission rate differential signal are in phase, and the control signal is positive (refer to FIG. 18). When the sign of the transmission rate differential signal is negative (when the center wavelength $\lambda_0$ of the optical signal is longer than the transmission rate center wavelength $\lambda_c$), the pilot signal and the transmission rate differential signal are in opposite phase, and the control signal is negative. Therefore, when the control signal is positive, the wavelength of the optical signal is changed to be increased. When the control signal is negative, the wavelength of the optical signal is changed to be decreased. With such control, it is possible to coincide the center wavelength $\lambda_0$ of the optical signal and the transmission center wavelength $\lambda_c$ of the wavelength demultiplexer with each other. This control is performed based on assumptions under which the wavelength is increased as the current injected to the semiconductor laser 41 is increased. If the wavelength is decreased as the current is increased, the control is performed in a reverse direction.

In the present embodiment, as with the third embodiment, the above discussion can be applied to the wavelength division multiplex transmission system having a structure in which a wavelength selector 65 is provided, instead of the wavelength demultiplexer 32, for extracting only an optical signal of a desired wavelength from the wavelength-multiplexed optical signal. Furthermore, as with the fourth embodiment, the wavelength division multiplex transmission system can have a structure in which the control signal generator 70 is provided at the transmitting side by using the characteristics of the wavelength multiplexer 53 illustrated in FIG. 14.

The present embodiment can achieve effects similar to those of the third embodiment. In addition, unlike the third embodiment which requires a feedback of the amplitude and phase of the transmission rate differential signal, only one type of signal is required to be fed back as the control signal, which is advantageous.

(Sixth Embodiment)

A sixth embodiment is similar in structure and function to the third embodiment, but is different therefrom only in signal waveforms. Therefore, components similar to those illustrated in FIG. 6 are provided with the same reference numerals for description.

The signal waveforms according to the present embodiment are described below with reference to FIGS. 19A through 19F.

As with the third embodiment, output light of the semiconductor laser 41 is intensity-modulated with the sine wave signal as illustrated in FIG. 19B, and is also wavelength-modulated. It is assumed here in that an optical modulation factor at the semiconductor laser 41 is m1. The waveforms of signals output from the polarity inverter 45 and the multiplexer 46 are similar to those of the third embodiment. The intensity modulator 47 modulates a signal output from the semiconductor laser 41 with a signal output from the multiplexer 46. Here, an optical modulation factor of the sine wave signal is assumed to be m2 which is set to be different from m1. Thus, unlike the third embodiment, the intensity of an optical signal output from the intensity modulator 47 includes part of sine wave signal components. Changes in wavelength, on the other hand, include those given at the semiconductor laser 41.

As with the third embodiment, a deviation between the center wavelength $\lambda_0$ and the transmission center wavelength $\lambda_c$ causes an intensity-modulated component (transmission rate differential signal) which has a frequency equal to that of the sine wave signal and whose amplitude is proportional to a first-order differential component of the transmission rate. On the other hand, the intensity-modulated component caused by the sine wave signal and outputted from the transmitting section 1101 is attenuated when passing through the wavelength demultiplexer 32 in proportion to its transmission rate. As a result, when the control signal generator 62 extracts, at the receiving side, a component having a frequency equal to that of the sine wave signal, a signal having a signal proportional to the transmission rate added with the transmission rate differential signal is obtained.

Figures 20, 21:
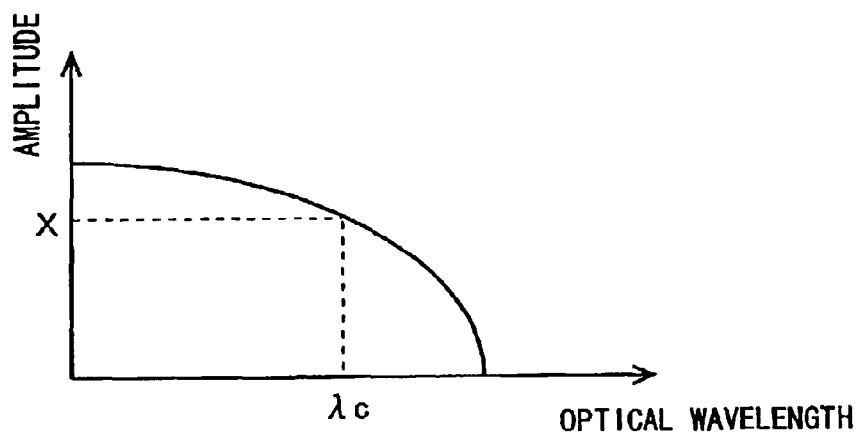
FIG. 20 is an illustration showing an optical wavelength and a control signal amplitude according to the sixth embodiment of the present invention.
FIG. 21 is another illustration showing an optical wavelength and a control signal according to the sixth embodiment of the present invention.
Figure 22:
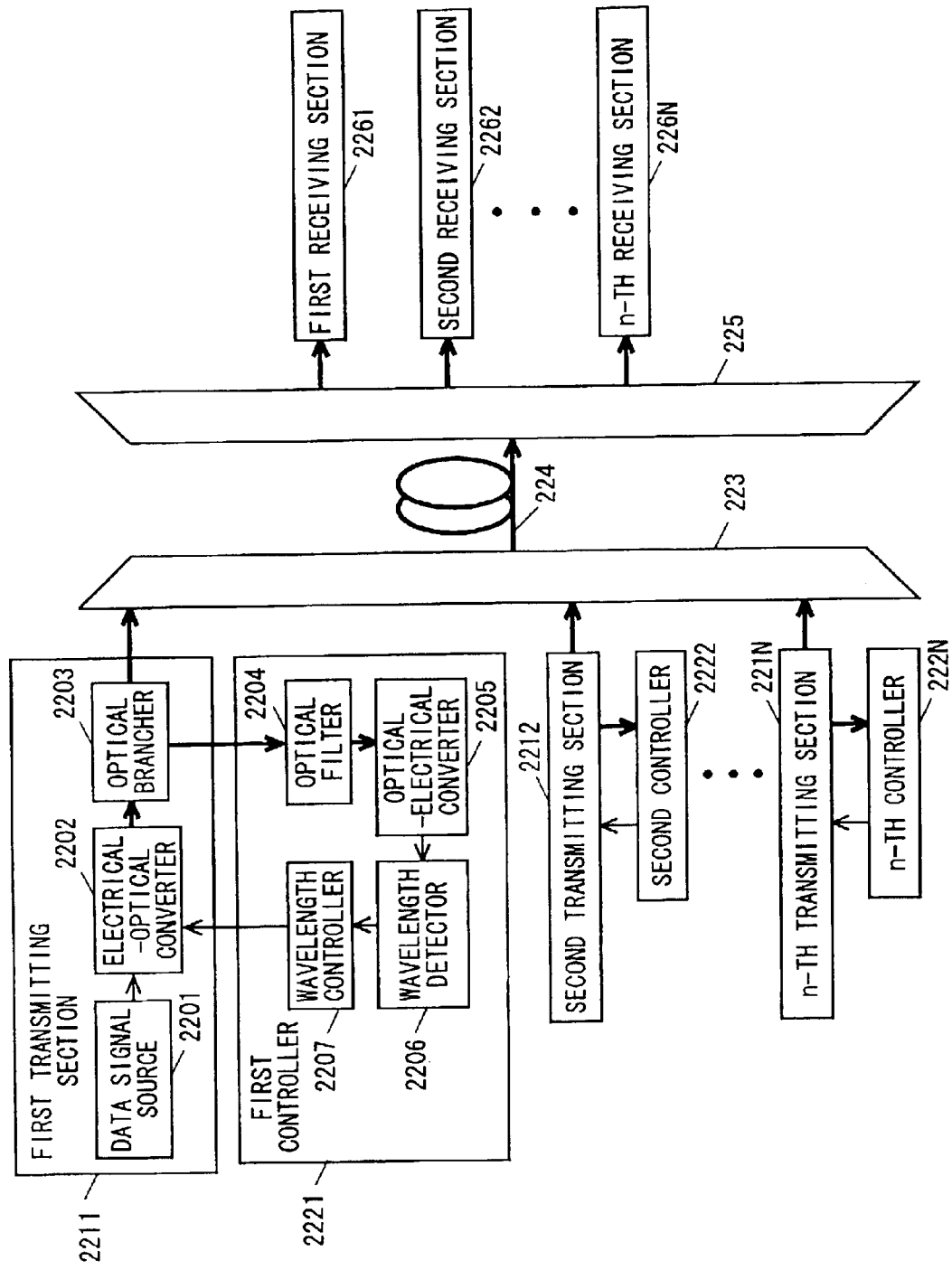
FIG. 22 is a block diagram illustrating the configuration of a conventional wavelength division multiplex transmission system.
Figure 23:
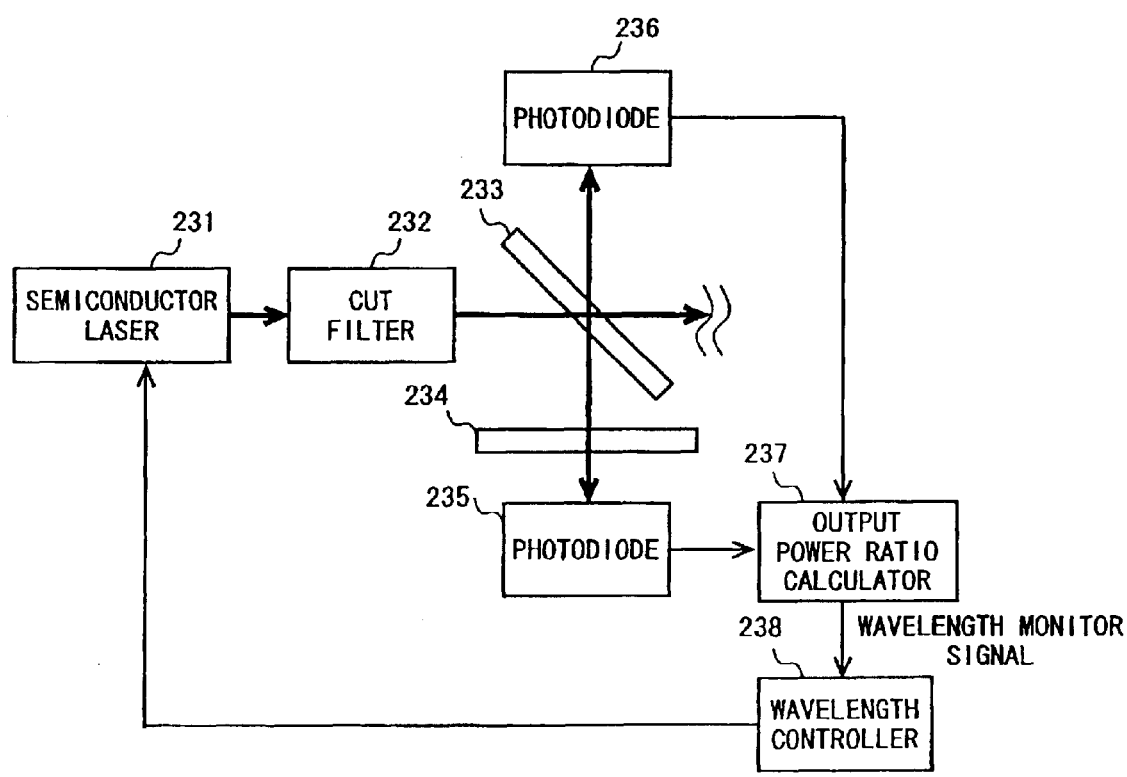
FIG. 23 is a block diagram illustrating the configuration of a conventional wavelength control apparatus.

FIG. 20 illustrates a relation between the amplitude of the sine wave signal component detected by the control signal generator 62 and the optical wavelength. It is assumed herein that the amplitude when the optical signal center wavelength $\lambda_0$ and the transmission center wavelength $\lambda_c$ coincide with each other is X. Under this assumption, as illustrated in FIG. 21, the amplitude is smaller than X when the optical signal center wavelength $\lambda_0$ is increased, while the amplitude is larger than X when the optical signal center wavelength $\lambda_0$ is decreased. Therefore, this amplitude is fed back as the control signal to the wavelength controller 121 so that the wavelength is decreased when the amplitude is smaller than X and is increased when the amplitude is larger than X. With this control, the center wavelength $\lambda_0$ of the optical signal can be made to coincide with the center wavelength $\lambda_c$ of the wavelength demultiplexer 32. In the above control, it is assumed that the wavelength is increased as the amount of current injected to the semiconductor laser 41 is increased. If the wavelength is decreased as the amount of current is increased, the control is performed in a reverse direction.

In the present embodiment, as with the third embodiment, the above discussion can be applied to the wavelength division multiplex transmission system having a structure in which a wavelength selector 65 is provided, instead of the wavelength demultiplexer 32, for extracting only an optical signal of a desired wavelength from the wavelength-multiplexed optical signal. Furthermore, as with the fourth embodiment, the wavelength division multiplex transmission system can have a structure in which the control signal generator 62 is provided at the transmitting side by using the characteristics of the wavelength multiplexer 53 illustrated in FIG. 14.

As with the fifth embodiment, unlike the third embodiment which requires a feedback of the amplitude and phase of the transmission rate differential signal, only one type of signal is required to be fed back as the control signal in the present embodiment. Furthermore, only the amplitude is detected in the control signal generator 62. Therefore, the structure of the system can be advantageously simplified.

In the above third through sixth embodiments, a sine wave signal output from the monitor signal source 102 is used. Alternatively, another appropriate periodic signal can be used instead of a sine wave signal.

While the invention has been described in detail, the foregoing description is in all aspects illustrative and not restrictive. It is understood that numerous other modifications and variations can be devised without departing from the scope of the invention.

What is claimed is:

1. A wavelength division multiplex transmission system in which optical signals of different wavelengths are transmitted by using a wavelength division multiplex scheme, the system comprising:

a transmitting section that uses an electrical-optical converter for generating an optical signal having therein a monitor signal multiplexed with a data signal to be transmitted and having a wavelength chirp due to the monitor signal;

a wavelength multiplexer operable to multiplex the optical signal generated by the transmitting section with another optical signal having a wavelength different from a wavelength of the optical signal;

an optical transmission path operable to propagate a multiplexed optical signal obtained by the wavelength multiplexer;

a wavelength demultiplexer operable to demultiplex the optical signal propagated via the optical transmission path, and obtain the optical signal generated by the transmitting section so as to obtain the data signal;

a control signal generator which includes:

an optical-electrical converter operable to convert the optical signal after a desired wavelength is extracted based on a transmission characteristic of the wavelength multiplexer or the wavelength demultiplexer to an electrical signal;

a filter operable to extract the monitor signal from the electrical signal obtained through conversion by the optical-electrical converter; and a difference detector operable to find a difference between the level of the monitor signal extracted by the filter and a predetermined reference level, and wherein the control signal generator generates a control signal based on the detection results of the difference detector; and a wavelength controller operable to control, based on the control signal, a wavelength of light output from the electrical-optical converter.

2. The wavelength division multiplex transmission system according to claim 1, wherein the difference detector can reset the reference level.

3. A wavelength division multiplex transmission system in which optical signals of different wavelengths are transmitted by using a wavelength division multiplex scheme, the system comprising:

a transmitting section that uses an electrical-optical converter for generating an optical signal having therein a monitor signal multiplexed with a data signal to be transmitted and having wavelength chirp due to the monitor signal;

a wavelength multiplexer operable to multiplex the optical signal generated by the transmitting section with another optical signal having a wavelength different from a wavelength of the optical signal;

an optical transmission path operable to propagate a multiplexed optical signal obtained by the wavelength multiplexer;

a wavelength demultiplexer operable to demultiplex the optical signal propagated via the optical transmission path, and obtain the optical signal generated by the transmitting section so as to obtain the data signal;

a control signal generator operable to generate a control signal based on the monitor signal included in the optical signal after a desired wavelength is extracted based on a transmission characteristic of the wavelength multiplexer or the wavelength demultiplexer; and a wavelength controller operable to control, based on the control signal, a wavelength of light output from the electrical-optical converter, wherein the light output from the electrical-optical converter is directly modulated by the monitor signal, and the transmitting section includes:

a polarity inverter operable to invert a polarity of the monitor signal for output; and an intensity modulator operable to intensity-modulate the light output from the electrical-optical converter with a signal having therein a signal output from the polarity inverter multiplexed with the data signal.

4. The wavelength division multiplex transmission system according to claim 3, wherein a modulation index of the electrical-optical converter and a modulation index of the intensity modulator are set so that, in the light output from the intensity modulator, an intensity-modulated component caused by the monitor signal and an intensity-modulated component caused by the signal output from the polarity inverter are cancelled by each other.

5. The wavelength division multiplex transmission system according to claim 4, wherein a plurality of said transmitting sections, said control signal generators, and said wavelength controllers are provided, the wavelength multiplexer has a plurality of input terminals each operable to pass only an optical signal having a predetermined different wavelength and a single output terminal, wavelength-multiplex optical signals of different wavelengths output from the plurality of said transmitting sections and received at the input terminals, and output an optical signal from the output terminal, the monitor signals each to be multiplexed on the data signal in each of the transmitting sections have different frequencies, and each of the control signal generators extracts the intensity-modulated component caused by the monitor signal multiplexed on the data signal at each corresponding transmitting section, and generates the control signal based on the extraction result.

6. The wavelength division multiplex transmission system according to claim 4, wherein the control signal generator includes an amplitude detector operable to detect an amplitude of the intensity-modulated component caused by the monitor signal in the optical signal after the desired wavelength is extracted based on the transmission characteristic of the wavelength multiplexer or the wavelength demultiplexer, and a phase detector operable to detect a phase of the intensity-modulated component, and output the detected amplitude and phase as the control signal, and the wavelength controller determines whether to increase or decrease the wavelength of the light output from the electrical-optical converter based on the phase, and controls the wavelength of the light so that the amplitude is 0.

7. The wavelength division multiplex transmission system according to claim 4, further comprising:

a pilot signal source operable to divide a frequency of the monitor signal and output a pilot signal, wherein the intensity modulator intensity-modulates the light output from the electrical-optical converter with a signal having therein the signal output from the polarity inverter and the pilot signal output from the pilot signal source multiplexed with the data signal, the control signal generator includes:

an optical-electrical converter operable to convert the optical signal after the desired wavelength is extracted based on the transmission characteristic of the wavelength multiplexer or the wavelength demultiplexer to an electrical signal;

a first band-pass filter operable to extract an intensity-modulated component caused by the monitor signal from the electrical signal output from the optical-electrical converter;

a second band-pass filter operable to extract the pilot signal from the electrical signal;

a frequency multiplier operable to multiply a frequency of the pilot signal extracted by the second band-pass filter;

a multiplier operable to multiply the intensity-modulated component extracted by the first band-pass filter by the pilot signal output from the frequency multiplier; and a low-pass filter operable to extract a direct current level of an output signal of the multiplier and output the direct current level as the control signal, and the wavelength controller controls the wavelength of the electrical-optical converter so that the direct current level output from the low-pass filter is 0.

8. The wavelength division multiplex transmission system according to claim 3, wherein a modulation index of the electrical-optical converter and a modulation index of the intensity modulator are set so that, in the light output from the intensity modulator, an intensity-modulated component caused by the monitor signal and an intensity-modulated component caused by the signal output from the polarity inverter are partially cancelled by each other, and an output waveform of the electrical-optical converter is controlled so that an amplitude of an intensity-modulated component caused by the monitor signal in the optical signal after the desired wavelength is extracted based on the transmission characteristic of the wavelength multiplexer or the wavelength demultiplexer has a predetermined value.

9. An optical transmitting apparatus for transmitting optical signals having different wavelengths by using a wavelength division multiplex technique, comprising:

a transmitting section that uses an electrical-optical converter for generating an optical signal having therein a monitor signal multiplexed with a data signal to be transmitted and having wavelength chirp due to the monitor signal;

a wavelength multiplexer operable to multiplex the optical signal generated by the transmitting section with another optical signal having a wavelength different from a wavelength of the optical signal;

a control signal generator which includes:

an optical-electrical converter operable to convert the optical signal after a desired wavelength is extracted based on a transmission characteristic of the wavelength multiplexer to an electrical signal;

a filter operable to extract the monitor signal from the electrical signal obtained through conversion by the optical-electrical converter; and a difference detector operable to find a difference between the level of the monitor signal extracted by the filter and a predetermined reference level, and wherein the control signal generator generates a control signal based on the detection results of the difference detector; and a wavelength controller operable to control, based on the control signal, a wavelength of light output from the electrical-optical converter.

10. An optical transmitting method for transmitting optical signals having different wavelengths by using a wavelength division multiplex technique, comprising:

generating, by using an electrical-optical converter, an optical signal having therein a monitor signal multiplexed with a data signal to be transmitted and having wavelength chirp due to the monitor signal;

transmitting the generated optical signal via a wavelength multiplexer, an optical transmission path, and a wavelength demultiplexer;

converting the optical signal after a desired wavelength is extracted based on a transmission characteristic of the wavelength multiplexer or the wavelength demultiplexer to an electrical signal, extracting the monitor signal from the electrical signal, finding a difference between the level of the extracted monitor signal and a predetermined reference level, and generating a control signal based on the difference, and controlling, based on the control signal, a wavelength of light output from the electrical-optical converter.

11. An optical transmitting apparatus for transmitting optical signals having different wavelengths by using a wavelength division multiplex technique, comprising:

a transmitting section that uses an electrical-optical converter for generating an optical signal having therein a monitor signal multiplexed with a date signal to be transmitted and having wavelength chirp due to the monitor signal;

a wavelength multiplexer operable to multiplex the optical signal generated by the transmitting section with another optical signal having a wavelength different from a wavelength of the optical signal;

a control signal generator operable to generate a control signal based on the monitor signal included in the optical signal after a desired wavelength is extracted based on a transmission characteristic of the wavelength multiplexer; and a wavelength controller operable to control, based on the control signal, a wavelength of light output from the electrical-optical converter, wherein the light output from the electrical-optical converter is directly modulated by the monitor signal, and the transmitting section includes:

a polarity inverter operable to invert a polarity of the monitor signal for output; and an intensity modulator operable to intensity-modulate the light output from the electrical-optical converter with a signal having therein a signal output from the polarity inverter multiplexed with the data signal.

12. An optical transmitting method for transmitting optical signals having different wavelengths by using a wavelength division multiplex technique, comprising:

generating, by using an electrical-optical converter, an optical signal having therein a monitor signal multiplexed with a data signal to be transmitted and having wavelength chirp due to the monitor signal;

transmitting the generated optical signal via a wavelength multiplexer, an optical transmission path, and a wavelength demultiplexer;

generating a control signal based on the monitor signal included in the optical signal after a desired wavelength is extracted based on a transmission characteristic of the wavelength multiplexer or the wavelength demultiplexer; and controlling, based on the control signal, a wavelength of light output from the electrical-optical converter, wherein the light output from the electrical-optical converter is directly modulated by the monitor signal, and wherein in said generating, a polarity of the monitor signal is inverted for output, and the light output from the electrical-optical converter with a signal having therein the polarity-inverted monitor signal multiplexed with the data signal is intensity-modulated.

* * * * *